(12) United States Patent
Mu

(10) Patent No.: US 11,963,258 B2
(45) Date of Patent: Apr. 16, 2024

(54) METHOD AND DEVICE FOR PREMATURELY TERMINATING TRANSMISSION

(71) Applicant: BEIJING XIAOMI MOBILE SOFTWARE CO., LTD., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 545 days.

(21) Appl. No.: 17/278,220

(22) PCT Filed: Sep. 19, 2018

(86) PCT No.: PCT/CN2018/106545
§ 371 (c)(1),
(2) Date: Mar. 19, 2021

(87) PCT Pub. No.: WO2020/056641
PCT Pub. Date: Mar. 26, 2020

(65) Prior Publication Data
US 2021/0368579 A1 Nov. 25, 2021

(51) Int. Cl.
*H04W 72/04* (2023.01)
*H04W 4/70* (2018.01)
(Continued)

(52) U.S. Cl.
CPC ............ *H04W 76/36* (2018.02); *H04W 4/70* (2018.02); *H04W 72/0446* (2013.01); *H04W 72/23* (2023.01)

(58) Field of Classification Search
CPC .... H04W 4/70; H04W 72/0446; H04W 72/23
See application file for complete search history.

(56) References Cited

U.S. PATENT DOCUMENTS

2013/0343239 A1* 12/2013 Damnjanovic ....... H04W 72/23
370/280
2017/0026164 A1* 1/2017 Damnjanovic ... H04W 72/0446
(Continued)

FOREIGN PATENT DOCUMENTS

| CN | 103209062 A | 7/2013 |
| CN | 108200556 A | 6/2018 |
| WO | 2016154899 A1 | 10/2016 |

OTHER PUBLICATIONS

International Search Report of PCT/CN2018/106545 dated Jun. 17, 2019 with English translation, (4p).
(Continued)

*Primary Examiner* — Fahmida S Chowdhury
(74) *Attorney, Agent, or Firm* — Arch & Lake LLP

(57) ABSTRACT

Methods and devices for prematurely terminating a transmission are provided. The method includes that a base station in a machine type communication (MTC) system receives a first data repeatedly uploaded by a terminal in the MTC system. Additionally, the base station determines whether all data blocks included in the first data are successfully demodulated. The first target number of times is a maximum number of times configured by the base station for the terminal for repeatedly uploading the first data. When determining that all the data blocks included in the first data are successfully demodulated before the total number of times of repeatedly uploading the first data reaches the first target number of times, target downlink control information (DCI) is transmitted to the terminal. The target DCI is configured to instruct the terminal to prematurely terminate uploading the first data to the base station.

19 Claims, 22 Drawing Sheets

(51) Int. Cl.
*H04W 72/0446* (2023.01)
*H04W 72/23* (2023.01)
*H04W 76/36* (2018.01)

(56) References Cited

U.S. PATENT DOCUMENTS

| | | | |
|---|---|---|---|
| 2017/0303248 A1* | 10/2017 | Chatterjee | H04W 72/23 |
| 2018/0109276 A1* | 4/2018 | Wong | H04L 5/0044 |
| 2018/0279327 A1* | 9/2018 | Ying | H04W 72/0446 |
| 2018/0368174 A1* | 12/2018 | Jeon | H04W 72/044 |
| 2018/0375620 A1* | 12/2018 | Zhang | H04W 72/23 |
| 2019/0075563 A1* | 3/2019 | Babaei | H04L 5/0094 |
| 2019/0223168 A1* | 7/2019 | Li | H04W 72/23 |
| 2020/0008232 A1* | 1/2020 | Takeda | H04W 72/0446 |
| 2020/0067675 A1* | 2/2020 | Takeda | H04L 5/0053 |
| 2020/0196333 A1* | 6/2020 | Lin | H04L 5/0055 |
| 2020/0245351 A1* | 7/2020 | Takeda | H04W 72/0446 |
| 2020/0374722 A1* | 11/2020 | Takeda | H04L 5/0053 |
| 2021/0021380 A1* | 1/2021 | Nguyen | H04L 1/1607 |
| 2021/0144714 A1* | 5/2021 | Takeda | H04W 72/53 |

OTHER PUBLICATIONS

Huawei, et al., "SC-MTCH Transmission in NB-IoT", 3GPP TSG RAN WG1 Meeting #87 R1-1611152, Nov. 18, 2016 (5p).

\* cited by examiner

METHOD AND DEVICE FOR PREMATURELY TERMINATING TRANSMISSION

CROSS-REFERENCE TO RELATED APPLICATIONS

This application is the US national phase application of International Application No. PCT/CN2018/106545, filed on Sep. 19, 2018, the entire contents of which are incorporated herein by reference for all purposes.

TECHNICAL FIELD

The disclosure relates to the field of communications, and more particularly, to a method for prematurely terminating a transmission and a device for prematurely terminating a transmission.

BACKGROUND

In the related art, 3GPP (3rd Generation Partnership Project) release 16 proposes that one PDCCH (Physical Downlink Control Channel) may continuously schedule multiple uplink or downlink TBs (Transmission Blocks), as illustrated in FIG. 1A. Considering that there may be repeat transmissions in MTC (Machine Type Communication), a scheduling manner may be illustrated in FIG. 1B.

In addition, in order to increase the time diversity effect and improve the transmission efficiency, an alternate transmission mechanism may be employed in multi-TB scheduling. That is, a terminal may transmit different TBs alternately and repeatedly to a base station, as illustrated in FIG. 1C.

In the related art, the base station may configure a maximum number of times of transmitting different TBs alternately and repeatedly based on channel conditions of the terminal for the terminal. Due to factors such as channel measurement errors and channel volatility, the base station has successfully demodulated multiple different TBs when the total number of times of uploading different TBs alternately and repeatedly by the terminal is less than the maximum number of times. However, the terminal may continue to repeatedly and alternately upload multiple different TBs until the total number of times reaches the maximum number of times, as illustrated in FIG. 2. This may bring additional power consumption of the terminal in MTC.

SUMMARY

According to a first aspect of embodiments of the disclosure, there is provided a method for prematurely terminating a transmission. The method includes that a base station in an MTC system receives a first data repeatedly uploaded by a terminal in the MTC system. The first data may include a plurality of different data blocks currently transmitted from the terminal to the base station for demodulation.

Additionally, before a total number of times of repeatedly uploading the first data by the terminal reaches a first target number of times, the base station determines whether all data blocks included in the first data are successfully demodulated. The first target number of times is a maximum number of times configured by the base station for the terminal for repeatedly uploading the first data.

further, in response to determining that all the data blocks included in the first data are successfully demodulated before the total number of times of uploading repeatedly the first data by the terminal reaches the first target number of times, the base station may transmit target downlink control information (DCI) to the terminal. The target DCI is configured to instruct the terminal to prematurely terminate uploading the first data to the base station.

According to a second aspect of the embodiments of the disclosure, there is provided a method for prematurely terminating a transmission. The method includes that a base station in an MTC system receives a first data repeatedly uploaded by a terminal in the MTC system. The first data includes a plurality of different data blocks currently to be transmitted from the terminal to the base station for demodulation.

Additionally, the base station determines whether a preset number of data blocks included in the first data are successfully demodulated before a total number of times of repeatedly uploading the first data by the terminal reaches a first target number of times. The first target number of times is a maximum number of times configured by the base station for the terminal for repeatedly uploading the first data.

Further, the base station transmits target DCI to the terminal in response to determining that the preset number of data blocks included in the first data are successfully demodulated before the total number of times of repeatedly uploading the first data by the terminal reaches the first target number of times. The target DCI is configured to instruct the terminal to repeatedly upload a second data to the base station after prematurely terminating uploading the first data to the base station, and the second data comprises all data blocks included in the first data except for data blocks that the base station has successfully demodulated.

According to a third aspect of the embodiments of the disclosure, there is provided a method for prematurely terminating a transmission. The method includes that a terminal in an MTC system repeatedly uploads a first data to a base station in the MTC system. The first data may include a plurality of different data blocks currently transmitted from the terminal to the base station for demodulation.

Additionally, the terminal prematurely terminates uploading the first data to the base station in response to receiving target DCI from the base station before a total number of times of repeatedly uploading the first data reaches a first target number of times. The first target number of times is a maximum number of times configured by the base station for the terminal for repeatedly uploading the first data.

According to a fourth aspect of the embodiments of the disclosure, there is provided a base station in an MTC system. The base station includes a processor and a memory for storing instructions executable by the processor. The processor is configured to perform the method according to the second aspect above.

According to a fifth aspect of the embodiments of the disclosure, there is provided a terminal in an MTC system. The terminal includes a processor and a memory for storing instructions executable by the processor. The processor is configured to perform the method according to the third aspect above.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the disclosure is for the purpose of describing exemplary examples only and is not intended to limit the disclosure. As used in the disclosure and the appended claims, the singular forms "a," "an" and "the" are intended to include the plural forms as well, unless the context clearly indicates otherwise. It shall also be understood that the terms "and/or" used herein are intended to signify and include any or all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the disclosure, first information may be termed as second information; and similarly, second information may also be termed as first information. As used herein, the term "if" may be understood to mean "when" or "upon" or "in response to" depending on the context.

In the related art, after the base station successfully demodulates all the different data blocks uploaded by the terminal, the terminal may continue to upload the different data blocks alternately until the maximum number of times is reached. In order to solve this problem, after the base station successfully demodulates all the different data blocks uploaded by the terminal, the base station transmits the instruction of prematurely terminating the transmission to the terminal. The embodiments of the disclosure may propose the following two solutions for terminating prematurely the transmission for the situation where the terminal alternately uploads multiple data blocks.

In the first solution, after the base station successfully demodulates all the TBs (transport blocks) included in the first data unit uploaded by the terminal, the base station may transmit the target DCI to the terminal. The terminal may terminate uploading the first data unit to the base station based on the target DCI.

The first solution will be introduced below from the base station side in the MTC system.

Figure 1A:
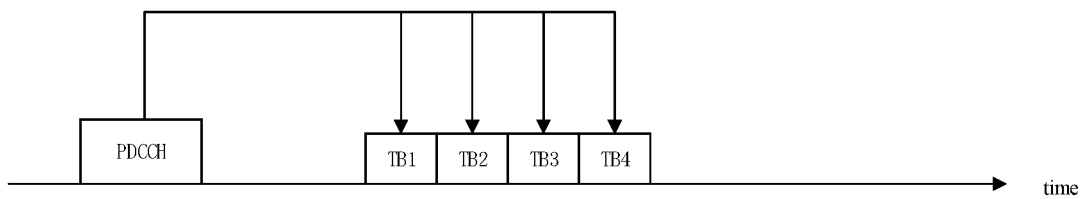
FIG. 1A to FIG. 1C are schematic diagrams of a scene of prematurely terminating a transmission in the related art, according to exemplary embodiments of the disclosure.
Figure 1B:
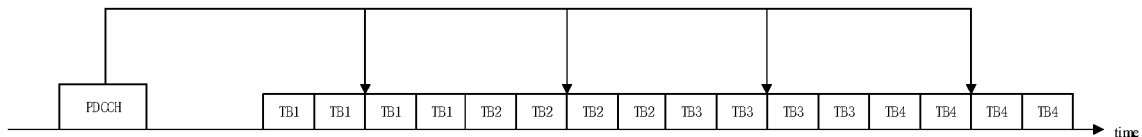
Figure 1C:
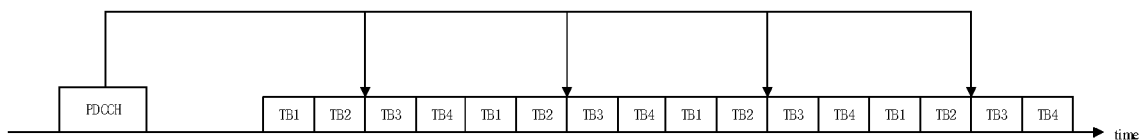
Figure 2:
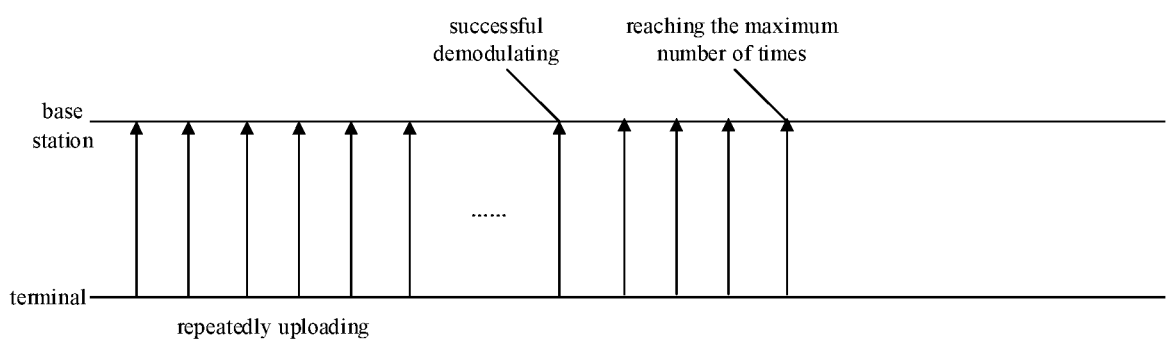
FIG. 2 is a schematic diagrams of a scene of prematurely terminating a transmission in the related art, according to exemplary embodiments of the disclosure.
Figure 3:
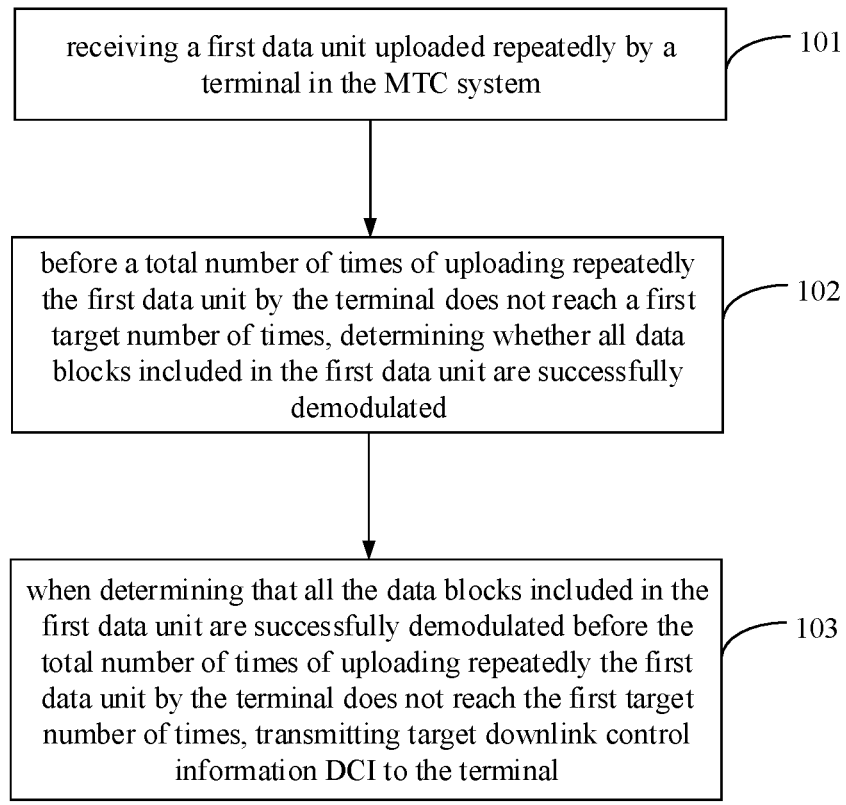
FIG. 3 is a flow chart of a method for prematurely terminating a transmission, according to exemplary embodiments of the disclosure.

The embodiments of the disclosure provide a method for prematurely terminating a transmission. The method may be applicable for the base station in the machine type communication (MTC) system. Referring to FIG. 3, FIG. 3 is a flow chart of a method for prematurely terminating a transmission, according to exemplary embodiments of the disclosure. The method may include the following.

At block 101, a first data unit uploaded repeatedly by a terminal in the MTC system may be received. The first data unit may include a plurality of different data blocks currently transmitted by the terminal to the base station for demodulation.

At block 102, before a total number of times of uploading repeatedly the first data unit by the terminal does not reach a first target number of times, it may be determined whether all data blocks included in the first data unit are successfully demodulated. The first target number of times is a maximum number of times configured by the base station for the terminal for uploading repeatedly the first data unit.

At block 103, when determining that all the data blocks included in the first data unit are successfully demodulated before the total number of times of uploading repeatedly the first data unit by the terminal does not reach the first target number of times, target downlink control information (DCI) may be transmitted to the terminal. The target DCI is configured to instruct the terminal to prematurely terminate uploading the first data unit to the base station.

In the above embodiments, when the base station demodulates successfully all the data blocks included in the first data unit, the base station may transmit the target DCI to the terminal, to instruct the terminal to prematurely terminate uploading the first data unit to the base station. Therefore, when the terminal repeatedly and alternately uploads different multiple data blocks, the purpose of prematurely terminating the transmission may be realized, which is beneficial to saving resources of the terminal in the MTC system.

Figure 4:
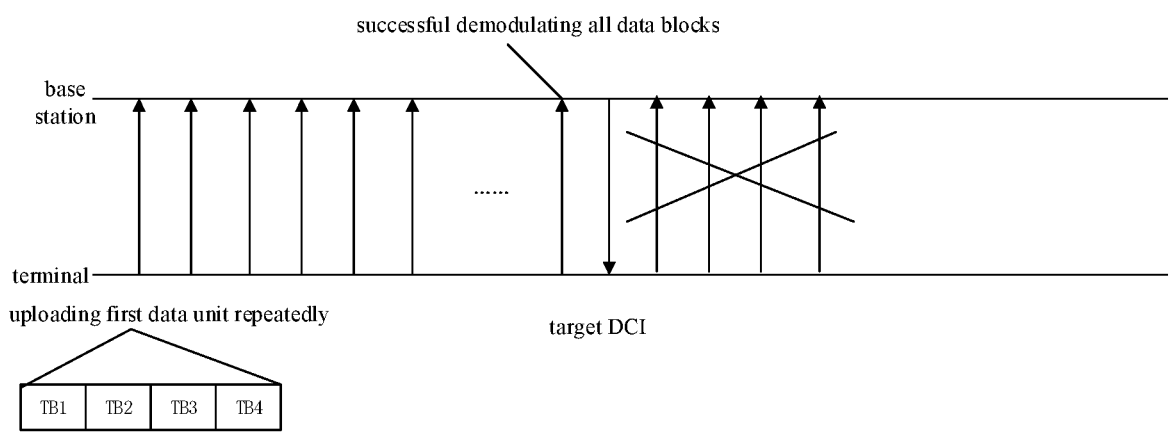
FIG. 4 is a schematic diagrams of a scene of prematurely terminating a transmission, according to exemplary embodiments of the disclosure.

For the above action at block 101, it is assumed that the data blocks that the terminal currently requires the base station to demodulate include four different data blocks TB1, TB2, TB3, and TB4. TB1, TB2, TB3, and TB4 form the first data unit. The terminal repeatedly uploads the first data unit to the base station. The base station repeatedly receives the first data unit according to the related technologies, as illustrated in FIG. 4.

For the above action at block 102, the base station may pre-configure the maximum number of times of uploading repeatedly the first data unit for the terminal, that is, pre-configure the first target number of times for the terminal. For example, if the first target number of times is configured to 32 times, the terminal may repeatedly upload the first data unit to the base station 32 times at most.

The base station may try to demodulate all the data blocks included in the first data unit according to related technologies after receiving the first data unit each time. For the above action at block 103, it is assumed that the first target number of times configured by the base station for the terminal is 32. The base station successfully demodulates all the data blocks included in the first data unit when the total number of times that the base station receives the first data unit repeatedly uploaded by the terminal reaches 20 times. The base station may transmit the target DCI to the terminal at this time, indicating that the terminal does not need to continue uploading the first data unit to the base station, thereby saving resources of the terminal in the MTC system, as illustrated in FIG. 4.

In some embodiments, the target DCI indication configured by the base station may include the premature terminating indication field. Optionally, the base station may configure the premature terminating indication field in the target DCI by the following manner.

In a first coverage enhancement mode with a better coverage condition, such as coverage enhancement mode A in the MTC system, the base station may configure a resource of the pre-designated 5-bit physical resource block in the target DCI to be 1. After receiving the target DCI, the terminal may determine that the transmission of the first data unit needs to be terminated prematurely.

In a second coverage enhancement mode with a poor coverage condition, such as coverage enhancement mode B in the MTC system, the base station may configure a resource corresponding to the pre-specified 4-bit modulation and coding mode field in the target DCI to be 1. After receiving the target DCI, the terminal determines that the transmission of the first data unit needs to be terminated prematurely.

In some embodiments, the first preset value and the second preset value may be the same or different, which is not limited in the disclosure In the above embodiments, the target DCI at least needs to include the premature terminating indication field, so that the terminal may determine to prematurely terminate uploading the first data unit to the base station based on the premature terminating indication field. The availability is high.

The first solution will be introduced again below from the terminal side in the MTC system.

Figure 5:
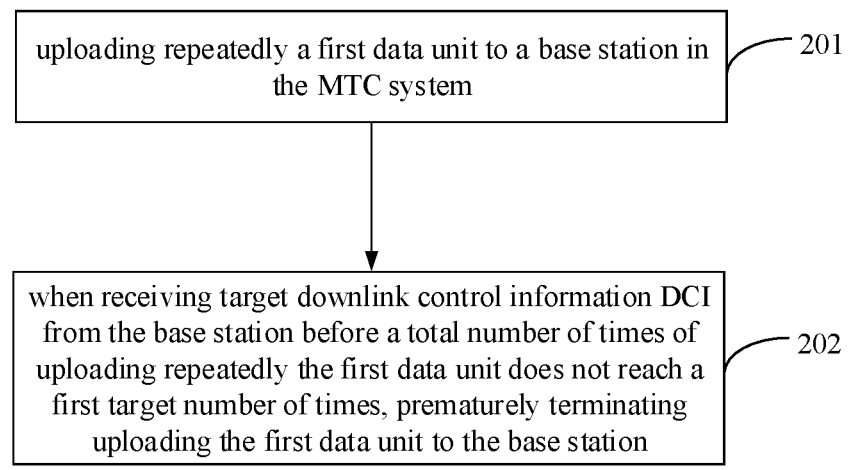
FIG. 5 is a flow chart of another method for prematurely terminating a transmission, according to exemplary embodiments of the disclosure.

The embodiments of the disclosure provide a method for prematurely terminating a transmission. The method may be applicable for the terminal in the MTC system. Referring to FIG. 5, FIG. 5 is a flow chart of a method for prematurely terminating a transmission, according to exemplary embodiments of the disclosure. The method may include the following.

At block 201, a first data unit may be uploaded repeatedly to a base station in the MTC system. The first data unit may include a plurality of different data blocks that the terminal currently transmits to the base station for demodulation.

At block 202, when receiving target downlink control information DCI from the base station before a total number of times of uploading repeatedly the first data unit does not reach a first target number of times, uploading the first data unit to the base station may be prematurely terminated. The first target number of times is a maximum number of times configured by the base station for the terminal for uploading repeatedly the first data unit.

In the above embodiments, when the terminal in the MTC system repeatedly and alternately uploads multiple different data blocks, that is, repeatedly uploads the first data unit, the terminal may prematurely terminate uploading the first data unit to the base station based on the target DCI transmitted by the base station after the base station demodulates successfully all the data blocks included in the first data unit. Therefore, it may greatly save resources of the terminal.

For the action at block 201.

For example, the data blocks that the terminal currently requires the base station to demodulate include four different data blocks TB1, TB2, TB3, and TB4. TB1, TB2, TB3, and TB4 form the first data unit. The terminal repeatedly uploads the first data unit to the base station.

For the action at block 202, it is assumed that the first target number of times configured by the base station for the terminal is 32. The base station successfully demodulates all the data blocks included in the first data unit when the total number of times that the base station receives the first data unit repeatedly uploaded by the terminal does not reach the first target number of times, that is, does not reach 32. The base station may transmit the target DCI to the terminal at this time.

After the terminal receives the target DCI according to related technologies, if it is in the first coverage enhancement mode with a better coverage condition such as coverage enhancement mode A in the MTC system, the terminal may search for whether the value corresponding to the resource of the pre-specified 5-bit physical resource block in the target DCI is 1. If it is 1, it is determined that the current DCI is the target DCI, and it needs to terminate prematurely transmitting the first transmission unit to the base station based on the indication of the premature terminating indication field.

Furthermore, after the terminal receives the target DCI according to related technologies, if it is in the second coverage enhancement mode with a poor coverage condition such as coverage enhancement mode B in the MTC system, the terminal may search for whether the value of the resource corresponding to the pre-specified 4-bit modulation and coding mode field in the target DCI is 1. If it is 1, it is determined that the current DCI is the target DCI, and it needs to terminate prematurely transmitting the first transmission unit to the base station based on the indication of the premature terminating indication field.

In the above embodiments, when the terminal in the MTC system repeatedly and alternately uploads multiple different data blocks, that is, repeatedly uploads the first data unit, the terminal may prematurely terminate uploading the first data unit to the base station based on the target DCI transmitted by the base station after the base station demodulates successfully all the data blocks included in the first data unit. Therefore, it may greatly save resources of the terminal.

Figure 6:
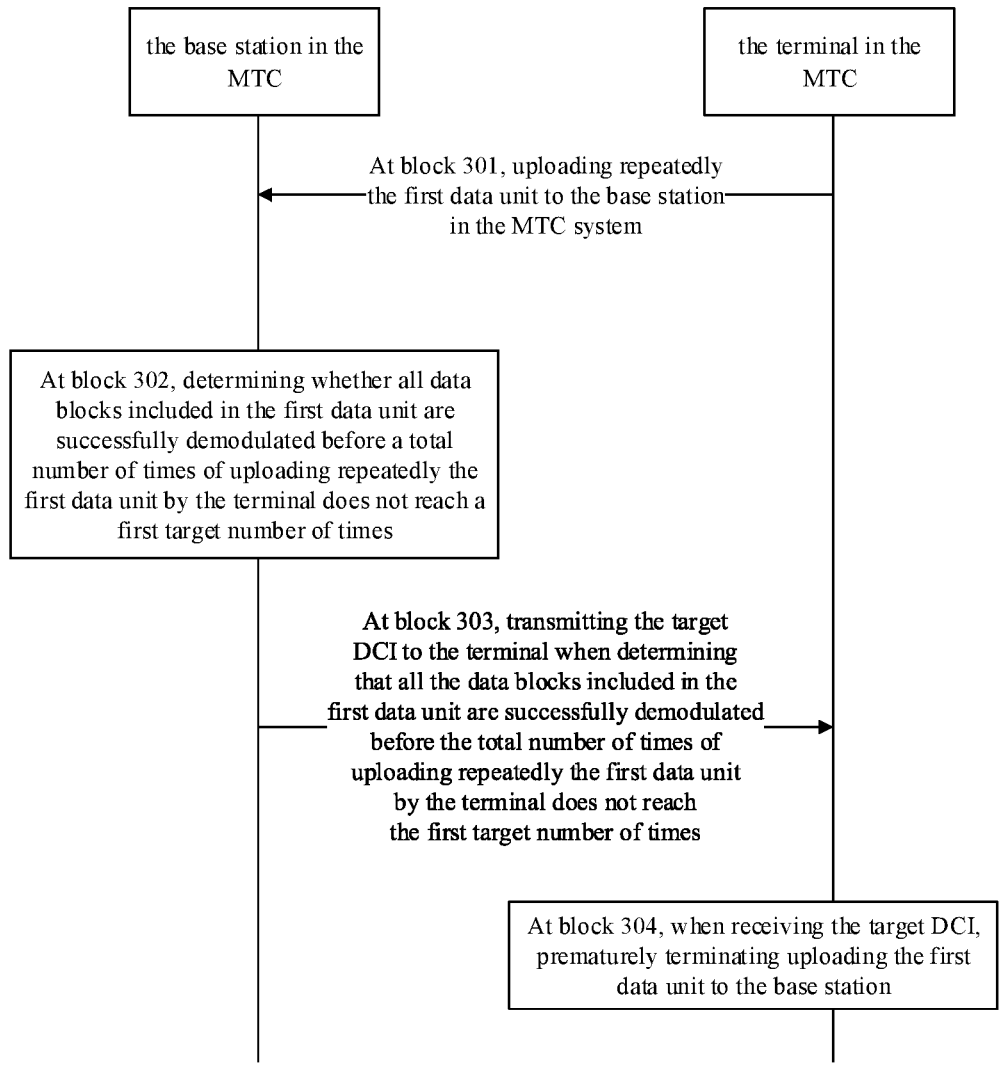
FIG. 6 is a flow chart of another method for prematurely terminating a transmission, according to exemplary embodiments of the disclosure.

The embodiments of the disclosure provide another method for prematurely terminating a transmission. Referring to FIG. 6, FIG. 6 is a flow chart of another method for prematurely terminating a transmission, according to exemplary embodiments of the disclosure. The method may include the following.

At block 301, the terminal in the MTC system uploads repeatedly the first data unit to the base station in the MTC system.

The first data unit may include a plurality of different data blocks that the terminal currently transmits to the base station for demodulation.

At block 302, the base station determines whether all data blocks included in the first data unit are successfully demodulated before a total number of times of uploading repeatedly the first data unit by the terminal does not reach a first target number of times.

At block 303, the base station transmits the target DCI to the terminal when determining that all the data blocks included in the first data unit are successfully demodulated before the total number of times of uploading repeatedly the first data unit by the terminal does not reach the first target number of times.

The first target number of times is a maximum number of times configured by the base station for the terminal for uploading repeatedly the first data unit. The target DCI at least may include the premature terminating indication field. The base station may employ the following manner to configure the premature terminating indication field in the target DCI.

In the first coverage enhancement mode with the better coverage condition, a resource corresponding to a physical resource block pre-designated in the target DCI may be employed as the premature terminating indication field and the premature terminating indication field may be configured as a first preset value. The first preset value may be 1.

In the second coverage enhancement mode with the poor coverage condition, a resource corresponding to a modulation and coding mode field pre-designated in the target DCI may be employed as the premature terminating indication field and the premature terminating indication field may be configured as a second preset value. The second preset value may be 1.

At block 304, when the terminal receives the target DCI, the terminal prematurely terminates uploading the first data unit to the base station.

In the above embodiments, when the terminal alternately uploads multiple different data blocks, that is, repeatedly uploads the first data unit, the base station may transmit the target DCI to the terminal when it is determined that all the data blocks included in the first data unit are successfully demodulated before the total number of times of uploading repeatedly the first data unit by the terminal does not reach the first target number of times, to instruct the terminal to prematurely terminate uploading the first data unit to the base station. Therefore, when the terminal repeatedly and alternately uploads different multiple data blocks, the purpose of prematurely terminating the transmission may be realized, which is beneficial to saving resources of the terminal in the MTC system.

The foregoing premature terminating the transmission requires the base station to transmit the target DCI to the terminal after successfully demodulating all the data blocks included in the first data unit, so that the terminal terminate prematurely continuing to repeatedly upload the first data unit. In some embodiments of the disclosure, optionally, when the base station successfully demodulates a part of the data blocks included in the first data unit, the terminal may terminate continuing to repeatedly upload the first data unit.

Another solution of prematurely terminating the transmission provided in the disclosure may be as follows.

In the second solution, the base station may transmit the target DCI to the terminal after successfully demodulating a preset number of data blocks in the first data unit uploaded by the terminal, and instruct the terminal to terminate prematurely transmitting the first data unit to the base station and to repeatedly upload the second data unit to the base station.

The second solution will be introduced below from the base station side in the MTC system.

Figure 7:
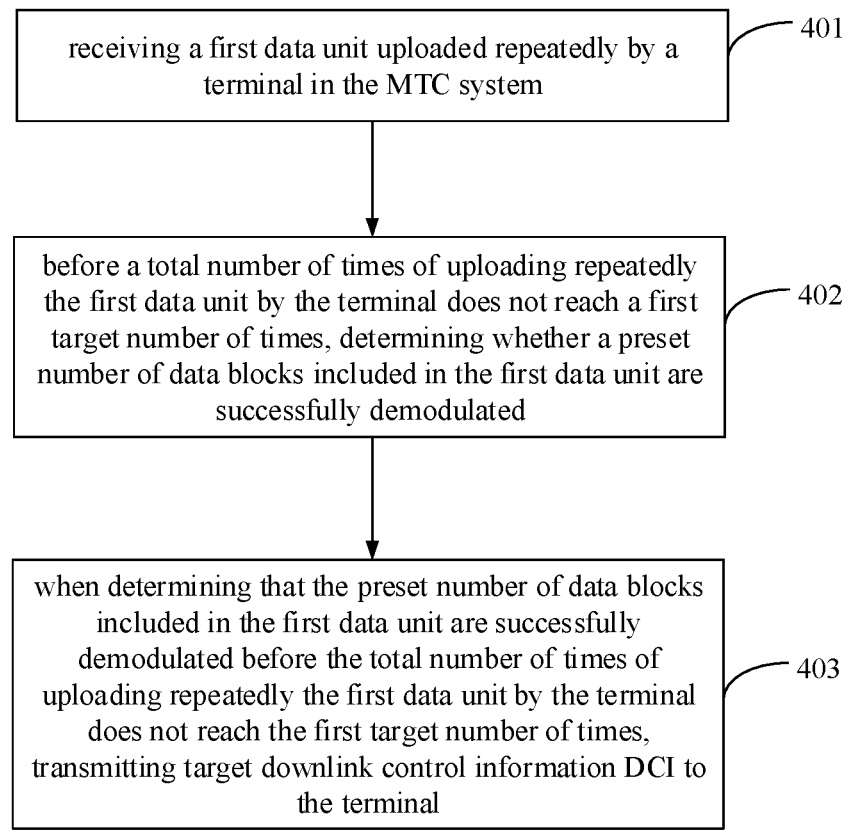
FIG. 7 is a flow chart of another method for prematurely terminating a transmission, according to exemplary embodiments of the disclosure.

The embodiments of the disclosure provide another method for prematurely terminating a transmission. The method may be applicable for the base station in the MTC system. Referring to FIG. 7, FIG. 7 is a flow chart of another method for prematurely terminating a transmission, according to exemplary embodiments of the disclosure. The method may include the following.

At block 401, a first data unit uploaded repeatedly by a terminal in the MTC system may be received. The first data unit may include a plurality of different data blocks that the terminal currently transmits to the base station for demodulation.

At block 402, before a total number of times of uploading repeatedly the first data unit by the terminal does not reach a first target number of times, it may be determined whether a preset number of data blocks included in the first data unit are successfully demodulated. The first target number of times may be a maximum number of times configured by the base station for the terminal for uploading repeatedly the first data unit.

At block 403, when determining that the preset number of data blocks included in the first data unit are successfully demodulated before the total number of times of uploading repeatedly the first data unit by the terminal does not reach the first target number of times, target DCI may be transmitted to the terminal.

The target DCI is configured to instruct the terminal to repeatedly upload a second data unit to the base station after prematurely terminating uploading the first data unit to the base station, and the second data unit may include all data blocks included in the first data unit except for data blocks that the base station has successfully demodulated.

In the above embodiments, the base station in the MTC system may also transmit the target DCI to the terminal when the base station successfully demodulates the preset number of data blocks included in the first data unit before the total number of times of uploading repeatedly the first data unit by the terminal does not reach the first target number of times, to instruct the terminal to prematurely terminate uploading the first data unit to the base station. In the above embodiments, when the terminal repeatedly and alternately uploads different multiple data blocks, the base station may transmit the target DCI to the terminal when a part of data blocks uploaded repeatedly and alternately by the terminal are demodulated successfully, so as to instruct the terminal to prematurely terminate uploading the first data unit, which is beneficial to saving resources of the terminal in the MTC system.

For the above action at block 401, it is assumed that the data blocks that the terminal currently requires the base station to demodulate include four different data blocks TB1, TB2, TB3, and TB4. TB1, TB2, TB3, and TB4 form the first data unit. The terminal repeatedly uploads the first data unit to the base station. The base station repeatedly receives the first data unit according to the related technologies, as illustrated in FIG. 4.

For the above action at block 402, it is assumed that the first target number of times is configured to be 32 times. The terminal may repeatedly upload the first data unit to the base station 32 times at most.

The base station may try to demodulate all the data blocks included in the first data unit according to related technologies after receiving the first data unit each time. Before the total number of times of repeatedly uploading the first data unit by the terminal does not reach the first target number of times, the base station may determine whether a part of data blocks in the first data unit is successfully demodulated, for example, the preset number of data blocks. The preset number may be 1, 2, 3 . . . .

For the above action at block 403, for example, the first target number of times configured by the base station for the terminal is 32. The base station successfully demodulates the preset number of data blocks in the first data unit when the total number of times that the base station receives the first data unit repeatedly uploaded by the terminal reaches 20 times. It is assumed that preset number is 2. The base station may transmit the target DCI to the terminal at this time, so that the terminal does not need to continue uploading the first data unit to the base station, thereby saving resources of the terminal in the MTC.

In some embodiments of the disclosure, if the terminal terminates repeatedly uploading the first data unit, but there are still some data blocks in the first data unit, which have not been successfully demodulated by the base station. It needs to continue to be transmitted to the base station, to avoid the base station missing data and affecting the terminal services. Therefore, after the terminal terminates prematurely uploading the first data unit to the base station, the terminal may continue to repeatedly upload the second data unit to the base station, where the second data unit includes all data blocks included in the first data unit except for data blocks that the base station has successfully demodulated. In this way, the base station may continue to demodulate the unsuccessfully demodulated data blocks in the first data unit For example, the first data unit includes four different data blocks TB1, TB2, TB3, and TB4. The preset number is 2. The first target number of times configured by the base station for the terminal is 32. The base station successfully demodulates two data blocks TB2 and TB3 in the first data unit when the total number of times that the base station receives the first data unit repeatedly uploaded by the terminal reaches 20 times. The base station may transmit the target DCI to the terminal at this time. After the terminal terminates prematurely uploading the first data unit to the base station, the terminal may start repeatedly uploading the second data unit to the base station. The second data unit includes TB1 and TB4. In this way, the base station may continue to demodulate all the data blocks TB1 and TB4 included in the second data unit until all the data blocks TB1 and TB4 are successfully demodulated.

In the above embodiments, when the terminal repeatedly and alternately uploads different multiple data blocks, the base station may transmit the target DCI to the terminal when the part of data blocks uploaded repeatedly and alternately by the terminal are demodulated successfully, so as to instruct the terminal to prematurely terminate uploading the first data unit, which is beneficial to saving resources of the terminal in the MTC system.

In some embodiments, the base station may use any one of the following manners to determine the preset number.

In the first manner, a number of data blocks, predefined in a communication protocol, that the base station needs to successfully demodulate in the first data unit, may be used as the preset number.

In some embodiments, the number of data blocks that the base station needs to successfully demodulate in the first data unit may be predefined in the underlying protocol of the base station and the terminal of the MTC system. When the base station needs to determine the preset number, the base station may directly use the predefined number of data blocks that the base station needs to successfully demodulate in the first data unit as the preset number.

In the second manner, the preset number may be configured by the base station for the terminal through a first preset signaling.

Optionally, the first preset signaling may be a high-level RRC (Radio Resource Control) signaling.

The base station may configure the preset number for the terminal through the RRC signaling. Of course, the value of the preset number is less than the total number of all the data blocks included in the first data unit.

In the above embodiments, the preset number may be determined according to the communication protocol or needs of the base station itself, which is easy to implement and has high availability.

Figure 8:
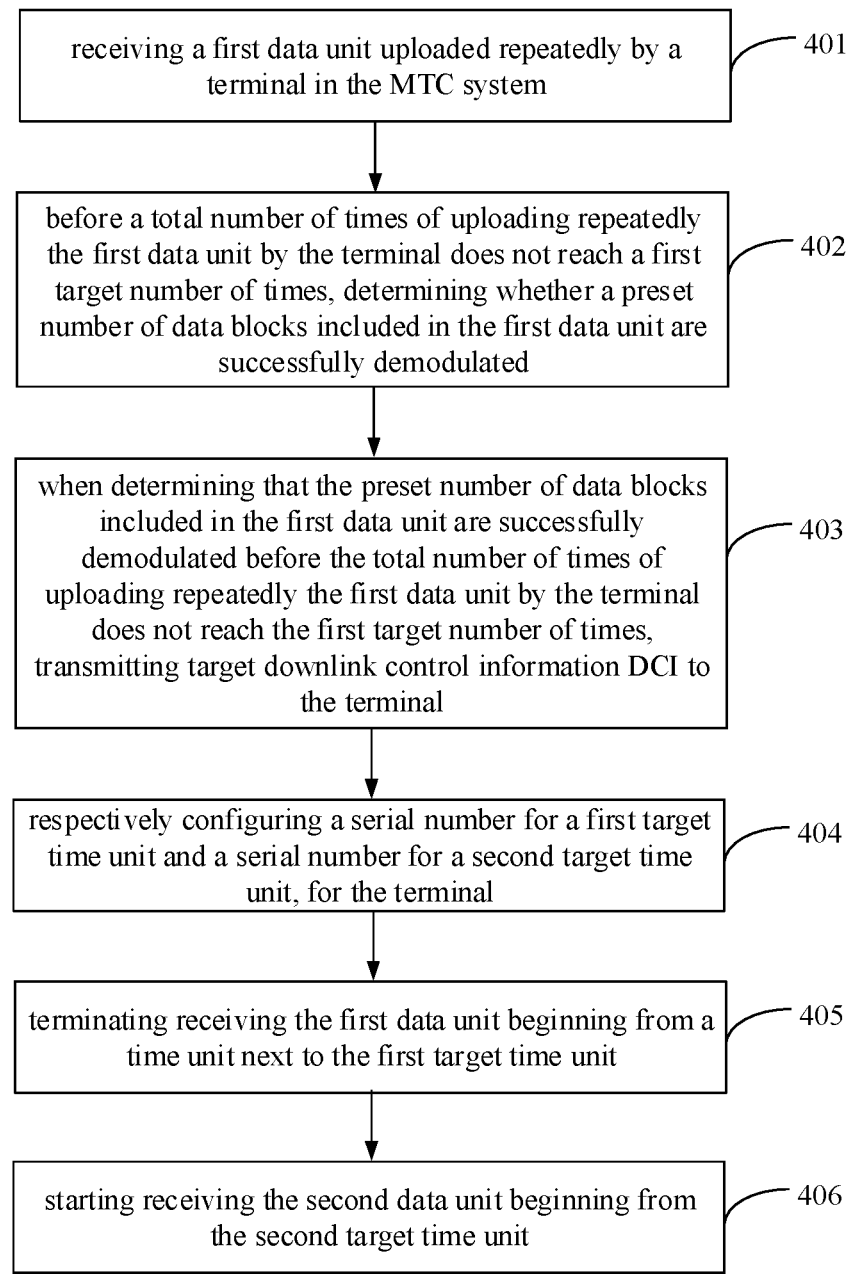
FIG. 8 is a flow chart of another method for prematurely terminating a transmission, according to exemplary embodiments of the disclosure.

In some embodiments, referring to FIG. 8, FIG. 8 is a flow chart of another method for prematurely terminating a transmission, according to exemplary embodiments of the disclosure in FIG. 7. The method may further include the following.

At block 404, a serial number for a first target time unit and a serial number for a second target time unit, may be configured for the terminal respectively.

In some embodiments of the disclosure, the time unit involved may be a sub frame, a time slot, and the like.

The following first introduces how the base station determines the serial number of the first target time unit.

In some embodiments of the disclosure, after the terminal receives the target DCI, the base station needs to prematurely terminate receiving the first data unit. Therefore, the first target time unit should be located after the target DCI. In order to facilitate data interaction between the base station and the terminal, a total number of times of uploading repeatedly, corresponding to each data block included in the first data unit, may be the same. That is, it may be ensured that before prematurely uploading the first data unit by the terminal, the total number of times of all data blocks included in the first data unit repeatedly uploaded is the same. In addition, after the terminal receives the target DCI, in addition to ensuring that the total number of times of repeatedly uploading, corresponding to each data block included in the first data unit, may be the same, it may also control the number of times of uploading repeatedly the first data unit by the terminal to be the least, so as to save resources of the terminal.

In some embodiments of the disclosure, in addition to the above conditions, it is also necessary to ensure that the serial number corresponding to the first target time unit, that is the serial number of the first target time unit, is greater than or equal to the first sum value. The first sum value may employ a sum value of a serial number corresponding to a last time unit for which the terminal receives the target DCI and a first time offset value.

For example, if the last time unit for which the terminal receives the target DCI is the time unit corresponding to the $18^{th}$ serial number, the serial number corresponding to the last time unit for which the terminal receives the target DCI is 18.

When determining the first time offset, the base station may use any of the following manners.

In the first manner, a time offset value, predefined in a communication protocol, corresponding to when the terminal prematurely terminates uploading repeatedly the first data unit, may be directly used as the first time offset value.

Assuming that the first data unit includes 4 data blocks, the communication protocol predefines that the time offset value corresponding to when the terminal prematurely terminates uploading repeatedly the first data unit is 4, and the first time offset value is 4.

In the second manner, the first time offset value may be configured directly by the base station for the terminal through a first preset signaling or a second preset signaling.

The first preset signaling may be a high-level RRC signaling, and the second preset signaling may be a MAC (Media Access Control) signaling of the physical layer.

It is assumed that the serial number corresponding to the last time unit for which the terminal receives the target DCI is 18 and the first time offset value is 5, the serial number of the first target time unit needs to be greater than the first sum value 18+5=23.

The above embodiments are further illustrated as follows.

It is assumed that the total number of data blocks included in the first data unit is 4, the first sum value is 23, and the serial number corresponding to the last time unit for which the terminal receives the target DCI is 18, the serial number of the first target time unit needs to be greater than or equal to 23. The first target unit also needs to ensure that the total number of times of repeatedly uploading of each data block included in the first data unit uploaded by the terminal is the same, and the number of times of uploading the first data unit is the least. Therefore, it may be determined that the serial number of the first target time unit is 23.

The following introduces how the base station determines the serial number of the second target time unit.

If the last time unit for which the terminal receives the target DCI is the time unit corresponding to the $18^{th}$ serial number, the serial number corresponding to the last time unit for which the terminal receives the target DCI is 18.

Furthermore, the base station may use any of the following manners to determine the second time offset value.

In the first manner, the second time offset value may be calculated based on a correspondence between first time offset values and second time offset values predefined in a communication protocol and the first time offset value.

For example, the second time offset value may be the first time offset value plus 1. The base station may calculate the second time offset value based on the foregoing correspondence and the previously determined first time offset value. The first time offset value is 5, and the second time offset value may be 6.

In the second manner, the base station may configure the second time offset value for the terminal through a first preset signaling or a second preset signaling.

The first preset signaling may be the RRC signaling, and the second preset signaling may be the MAC signaling. The base station may configure the second time offset value for the terminal based on the first time offset value. For example, the first time offset value is 5. Since the second time offset value is greater than the first time offset value, the base station may configure the second time offset value to be 6 for the terminal.

After determining the serial number corresponding to the last time unit for which the terminal receives the target DCI and the second time offset value, the base station may calculate the second sum value. The serial number of the second target time unit needs to be greater than or equal to the second sum value. For example, if the serial number corresponding to the last time unit for which the terminal receives the target DCI is 18, and the second time offset value is 6, the serial number of the second target time unit needs to be greater than or equal to 24.

Or, the base station may directly calculate the sum of the serial number of the first target time unit and the third time offset value, and use the sum as the second sum value. The manner of determining the third time offset value by the base station is the same as the manner of determining the second time offset value by the base station, and details are not described herein again. In some embodiments of the disclosure, the third time offset value and the second time offset value may be the same or different.

For example, if the serial number of the first target time unit is 23 and the third time offset value is 6, the second sum value is 29, and the serial number of the second target time unit needs to be greater than or equal to 29 accordingly.

Of course, the second target time unit also needs to be the first time unit that the terminal repeatedly uploads the second data unit after the first target time unit. Therefore, if the serial number of the first target time unit is 23, and the serial number of the second target time unit is greater than or equal to 24, the serial number of the second target time unit may be determined as 24.

At block 405, receiving the first data unit may be terminated beginning from a time unit next to the first target time unit.

In this action, if the serial number of the first target time unit is 23, the base station may terminate receiving the first data unit repeatedly uploaded by the terminal within the $24^{th}$ time unit.

At block 406, it may start receiving the second data unit beginning from the second target time unit.

In this action, if the serial number of the second target time unit is 24, the base station may start receiving the second data unit repeatedly uploaded by the terminal within the $24^{th}$ time unit.

In the above embodiments, the base station needs to configure the serial number for the first target time unit and the serial number for the second target time unit, for the terminal. Therefore, the base station side and the terminal side may uniformly determine the time point of terminating receiving the first data unit and the time point of starting receiving the second data unit, which may facilitate data interaction between the base station and the terminal, to prevent missing data from affecting terminal services, and effectively save resources of the base station side and resources of the terminal.

In some embodiments, the target DCI transmitted by the base station is also required to include the process number of the Hybrid Automatic Repeat Request (HARQ) corresponding to successfully demodulated data blocks in the first data unit, in addition to the premature terminating indication field. Therefore, it is convenient for the terminal to determine the data blocks successfully demodulated by the base station based on the target DCI.

Optionally, in a first coverage enhancement mode with a better coverage condition, such as coverage enhancement mode A in the MTC system, the base station may configure a resource of the pre-designated 5-bit physical resource block in the target DCI to be 1. After receiving the target DCI, the terminal may determine that the transmission of the first data unit needs to be terminated prematurely. Furthermore, the terminal may determine the data blocks successfully demodulated by the base station based on the process number of the HARQ in the target DCI.

In addition, in a second coverage enhancement mode with a poor coverage condition, such as coverage enhancement mode B in the MTC system, the base station may configure a resource corresponding to the pre-specified 4-bit modulation and coding mode field in the target DCI to be 1. After receiving the target DCI, the terminal determines that the transmission of the first data unit needs to be terminated prematurely. Furthermore, the terminal may determine the data blocks successfully demodulated by the base station based on the process number of the HARQ in the target DCI.

In the above embodiments, the target DCI transmitted by the base station at least includes the premature terminating indication field, and the process number of the Hybrid Automatic Repeat Request (HARQ) corresponding to successfully demodulated data blocks in the first data unit. Therefore, it is convenient for the terminal to prematurely terminate uploading the first data unit to the base station based on the premature terminating indication field. Furthermore, it is convenient for the terminal to determine the data blocks successfully demodulated by the base station in the first data unit based on the process number of the HARQ carried in the target DCI, which is beneficial to the subsequent data interaction between the base station and the terminal.

In some embodiments, in order to better match the current channel conditions when the terminal repeatedly uploads the second data unit in the subsequent, optionally, the target DCI may also include the second target number of times. The second target number of times is the maximum number of times for uploading repeatedly the second data unit by the terminal. The second target number of times is less than the first target number of times.

In the above embodiments, the target DCI transmitted by the base station may further include the second target number of times. The second target number of times is the maximum number of times for uploading repeatedly the second data unit by the terminal. The second target number of times is less than the first target number of times. The base station may adjust the subsequent number of times of repeatedly uploading the second data unit by the terminal based on the target DCI, which improves the transmission efficiency of the subsequent second data unit.

Figure 9:
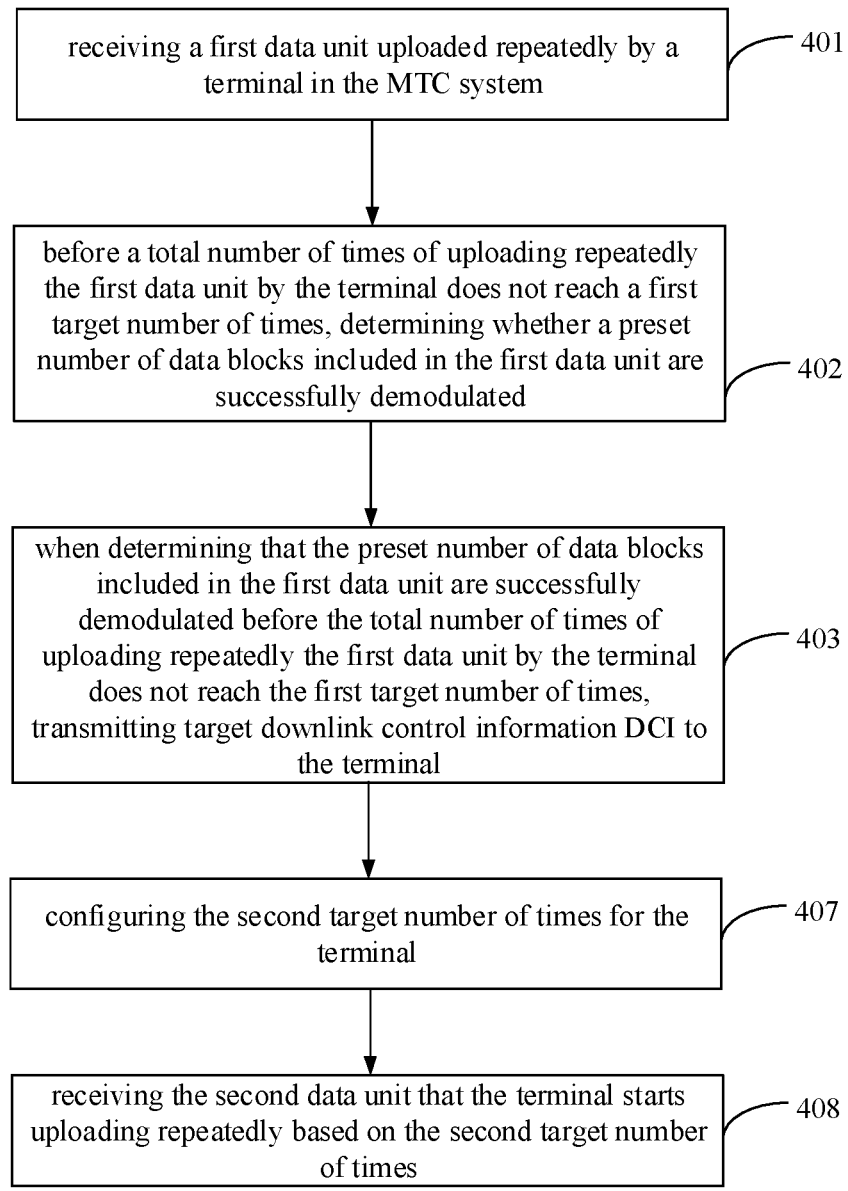
FIG. 9 is a flow chart of another method for prematurely terminating a transmission, according to exemplary embodiments of the disclosure.

In some embodiments, referring to 9, FIG. 9 is a flow chart of another method for prematurely terminating a transmission, according to exemplary embodiments of the disclosure in FIG. 7. The method may further include the following.

At block 407, the second target number of times may be configured for the terminal.

In the action, the base station may employ any of the following manners to configure the second target number of times for the terminal.

In the first manner, the base station may configure the set of candidate numbers of times for the terminal through the first preset signaling. Furthermore, the base station may specify the value in the set of candidate numbers of times through the target DCI as the value corresponding to the second target number of times.

In this manner, the base station may configure the set of candidate numbers of times for the terminal through the RRC signaling, such as the set of candidate numbers of times may be {6, 16, 24, 32}. If the first target number of times is 32, the base station may select the value smaller than the first target number of times from the set of candidate numbers of times as the value corresponding to the second target number of times. For example, 24 may be selected as the value corresponding to the second target number of times.

In the second manner, the base station may configure the set of candidate offsets for the terminal through the first preset signaling, and further select the value from the set of candidate offsets through the target DCI as the value corresponding to the target offset, and the second target number of times is calculated by the terminal based on the first target number of times and the target offset.

In this manner, the base station may configure the set of candidate offsets for the terminal through the RRC signaling, such as the set of candidate offsets may be {−4, −8, −12, −16}, and select one value from the set of candidate offsets through the target DCI as the value corresponding to the target offset, such as −8 may be selected as the target offset. The terminal may calculate the sum of the first target number of times and the target offset, to obtain the second target number of times, such as the second target number may be 32−8=24.

At block 408, the second data unit that the terminal starts uploading repeatedly based on the second target number of times may be received.

In this action, the total number of times that the terminal repeatedly uploads the first data unit may not exceed the first target number 32, and the total number of times that the terminal repeatedly uploads the second data unit may not exceed the second target number 24.

In some embodiments of the disclosure, the base station may configure the set of candidate numbers of times for the terminal, and further specify the value in the set of candidate numbers of times through the target DCI as the value corresponding to the second target number of times. Or, the base station may configure the set of candidate offsets for the terminal, and further select the value from the set of candidate offsets through the target DCI as the value corresponding to the target offset, and the second target number of times is calculated by the terminal based on the first target number of times and the target offset. Through the above process, the base station may adjust the number of times of repeatedly uploading the second data unit based on the current channel conditions, which improves the transmission efficiency and has high availability.

The second solution described above may be described below from the terminal side in the MTC system.

Figure 10:
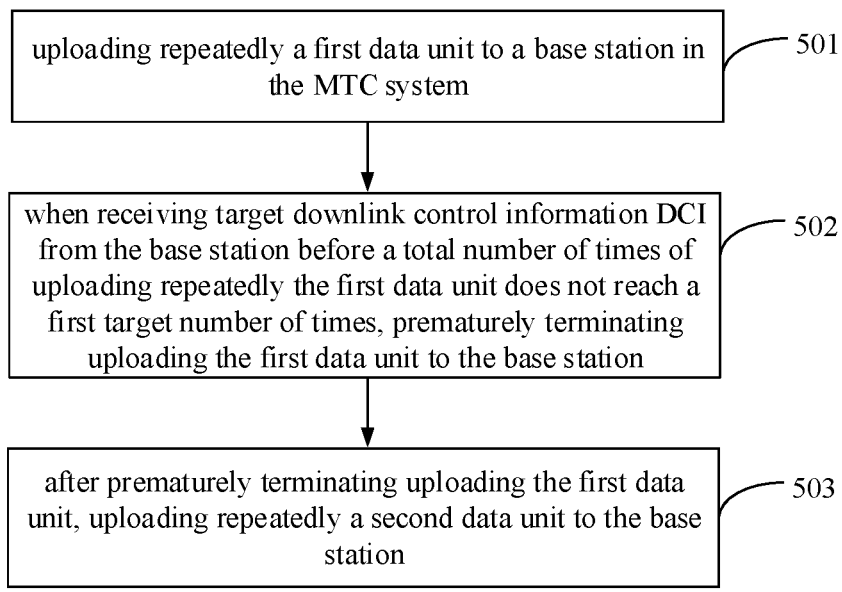
FIG. 10 is a flow chart of another method for prematurely terminating a transmission, according to exemplary embodiments of the disclosure.

The embodiments of the disclosure provide another method for prematurely terminating a transmission. The method may be applicable for the terminal in the MTC system. Referring to FIG. 10, FIG. 10 is a flow chart of another method for prematurely terminating a transmission, according to exemplary embodiments of the disclosure. The method may include the following.

At block 501, a first data unit may be uploaded repeatedly to a base station in the MTC system. The first data unit may include a plurality of different data blocks that the terminal currently transmits to the base station for demodulation.

At block 502, when receiving target downlink control information DCI from the base station before a total number of times of uploading repeatedly the first data unit does not reach a first target number of times, uploading the first data unit to the base station may be prematurely terminated. The first target number of times is a maximum number of times configured by the base station for the terminal for uploading repeatedly the first data unit.

At block 503, after prematurely terminating uploading the first data unit, a second data unit may be uploaded repeatedly to the base station. The second data unit may include all data blocks included in the first data unit except for data blocks that the base station has successfully demodulated.

In the above embodiments, the terminal may upload repeatedly and alternately different data blocks to the base station, that is, repeatedly upload the first data unit to the base station. If the base station determines that the preset number of data blocks included in the first data unit are successfully demodulated before the total number of times of uploading repeatedly the first data unit by the terminal does not reach the first target number of times, the base station may transmit the target DCI to the terminal. The terminal may terminate uploading the first data unit to the base station based on the target DCI, and start uploading repeatedly the second data unit to the base station. Through the above process, when the terminal repeatedly and alternately uploads different multiple data blocks, the base station may transmit the target DCI to the terminal when a part of data blocks uploaded repeatedly and alternately by the terminal are demodulated successfully, so as to instruct the terminal to prematurely terminate uploading the first data unit, which is beneficial to saving resources of the terminal in the MTC system.

For the action at block 501, the data blocks that the terminal currently requires the base station to demodulate include four different data blocks TB1, TB2, TB3, and TB4. TB1, TB2, TB3, and TB4 form the first data unit. The terminal repeatedly uploads the first data unit to the base station.

For the action at block 502, it is assumed that the first target number of times configured by the base station for the terminal is 32. The base station successfully demodulates the preset number of the data blocks in the first data unit when the total number of times that the base station receives the first data unit repeatedly uploaded by the terminal does not reach the first target number of times, that is, does not reach 32. The base station may transmit the target DCI to the terminal at this time.

In some embodiments, the base station may use a number of data blocks, predefined in a communication protocol, that the base station needs to successfully demodulate in the first data unit, as the preset number. Or the base station may configure the preset number for the terminal through a first preset signaling.

For the action at block 503, after the terminal receives the target DCI according to related technologies, if it is in the first coverage enhancement mode with a better coverage condition such as coverage enhancement mode A in the MTC system, the terminal may search for whether the value corresponding to the resource of the pre-specified 5-bit physical resource block in the target DCI is 1. If it is 1, it is determined that the current DCI is the target DCI, and it needs to terminate prematurely transmitting the first transmission unit to the base station based on the indication of the premature terminating indication field.

Furthermore, after the terminal receives the target DCI according to related technologies, if it is in the second coverage enhancement mode with a poor coverage condition such as coverage enhancement mode B in the MTC system, the terminal may search for whether the value of the resource corresponding to the pre-specified 4-bit modulation and coding mode field in the target DCI is 1. If it is 1, it is determined that the current DCI is the target DCI, and it needs to terminate prematurely transmitting the first transmission unit to the base station based on the indication of the premature terminating indication field.

Figure 11:
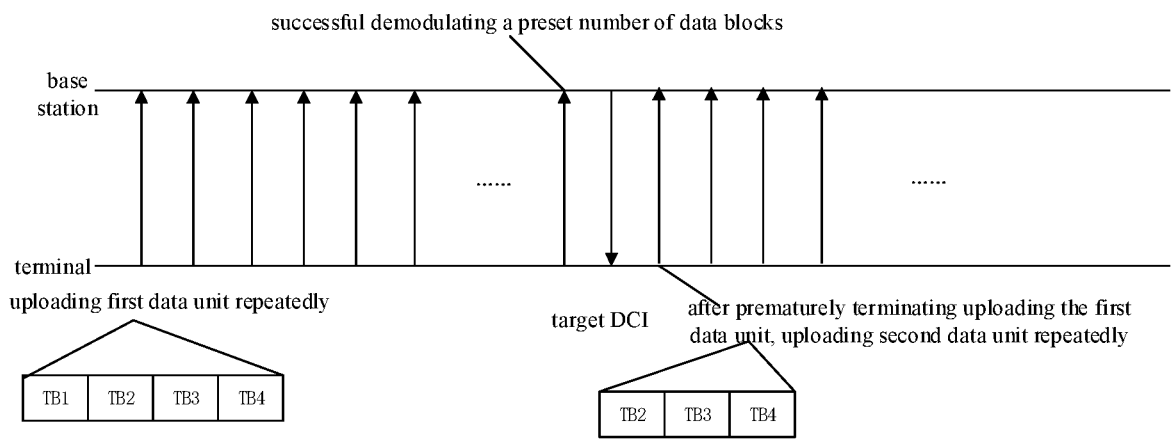
FIG. 11 is a schematic diagram of another scene of prematurely terminating a transmission, according to exemplary embodiments of the disclosure.

In the above embodiments, after the terminal terminates prematurely uploading the first data unit to the base station, in order to ensure that the base station may further demodulate other unsuccessful demodulated data blocks, the terminal may continue to repeatedly upload the second data unit to the base station. The second data unit may include all data blocks included in the first data unit except for data blocks that the base station has successfully demodulated, as illustrated in FIG. 11.

In the above embodiments, when the terminal repeatedly and alternately uploads different multiple data blocks, the base station may transmit the target DCI to the terminal when a part of data blocks uploaded repeatedly and alternately by the terminal are demodulated successfully, so as to instruct the terminal to prematurely terminate uploading the first data unit, which is beneficial to saving resources of the terminal in the MTC system.

Figure 12:
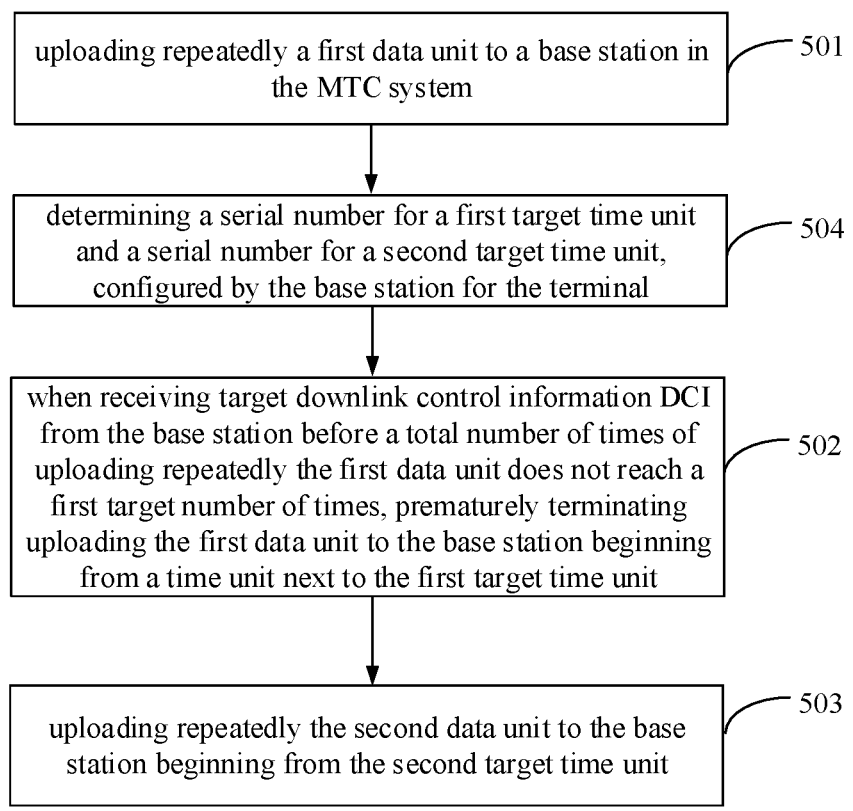
FIG. 12 is a flow chart of another method for prematurely terminating a transmission, according to exemplary embodiments of the disclosure.

In some embodiments, referring to 12, FIG. 12 is a flow chart of another method for prematurely terminating a transmission, according to exemplary embodiments of the disclosure in FIG. 10. The method may further include the following.

At block 504, a serial number for a first target time unit and a serial number for a second target time unit, configured by the base station for the terminal, may be determined.

The first target time unit satisfies the first target condition, and the second target time unit satisfies the second target condition.

In some embodiments of the disclosure, the time unit involved may be a sub frame, a time slot, and the like.

The manner how the terminal determines the serial number for the first target time unit and the serial number for the second target time unit are the same as the manner how the base station determines the serial number for the first target time unit and the serial number for the second target time unit. Reference may be made to the action at block 404, which is not repeated herein.

When the terminal determines the serial number for the first target time unit and the serial number for the second target time unit, the action at block 502 may be specified as follows.

Transmitting the first data unit to the base station may be terminated beginning from a time unit next to the first target time unit.

For example, the serial number of the first target time unit is 23, and the terminal may terminate transmitting the first data unit to the base station within the $24^{th}$ time unit.

When the terminal determines the serial number for the first target time unit and the serial number for the second target time unit, the action at block 503 may be specified as follows.

The second data unit may be uploaded repeatedly to the base station beginning from the second target time unit.

For example, the serial number of the second target time unit is 24, and the terminal may start uploading the first data unit to the base station within the $24^{th}$ time unit.

In the above embodiments, the base station may configure the serial number for the first target time unit and the serial number for the second target time unit, for the terminal. Therefore, the base station side and the terminal side may uniformly determine the time point of terminating receiving the first data unit and the time point of starting receiving the second data unit, which may facilitate the data interaction between the base station and the terminal, to prevent missing data from affecting terminal services, and to effectively save resources of the base station side and resources of the terminal.

Figure 13:
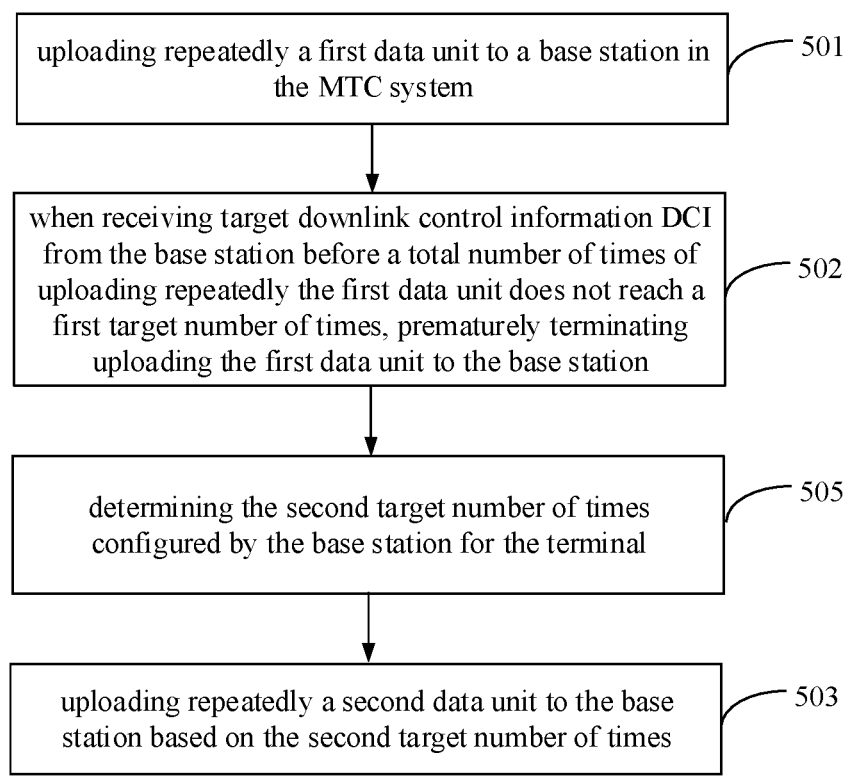
FIG. 13 is a flow chart of another method for prematurely terminating a transmission, according to exemplary embodiments of the disclosure.

In some embodiments, referring to FIG. 13, FIG. 13 is a flow chart of another method for prematurely terminating a transmission, according to exemplary embodiments of the disclosure in FIG. 10. The method may further include the following.

At block 505, the second target number of times configured by the base station for the terminal may be determined. The second target number of times is the maximum number of times for uploading repeatedly the second data unit by the terminal. The second target number of times is less than the first target number of times.

In this action, the base station may configure the set of candidate numbers of times for the terminal through the first preset signaling, such as the RRC signaling. For example, the set of candidate numbers of times may be $\{6, 16, 24, 32\}$. Furthermore, the base station may select through the target DCI the value in the set of candidate numbers of times as the value corresponding to the second target number of times, such as 24 may be selected as the value corresponding to the second target number of times.

Or, the base station may configure the set of candidate offsets for the terminal through the first preset signaling, such as the RRC signaling. For example, the set of candidate offsets may be $\{-4, -8, -12, -16\}$. The base station may select one value from the set of candidate offsets through the target DCI as the value corresponding to the target offset, such as select $-8$ as the target offset. The terminal may calculate the sum of the first target number of times and the target offset, to obtain the second target number of times, such as the obtained second target number may be 32−8=24.

After the terminal determines the second target number of times, the action at block 503 may be specified as follows.

The terminal starts uploading repeatedly the second data unit based on the second target number of times.

After the terminal starts uploading repeatedly the second data unit, the total number of times of repeatedly uploading the second data unit does not exceed the second target number of times.

In the above embodiments, the base station may adjust the subsequent number of times of repeatedly uploading the second data unit by the terminal through the target DCI, and the terminal may repeatedly upload the second data unit based on the second target number of times in the target DCI, which is more reasonable to use the current channel situation and improves the transmission efficiency of the subsequent second data unit.

Figure 14:
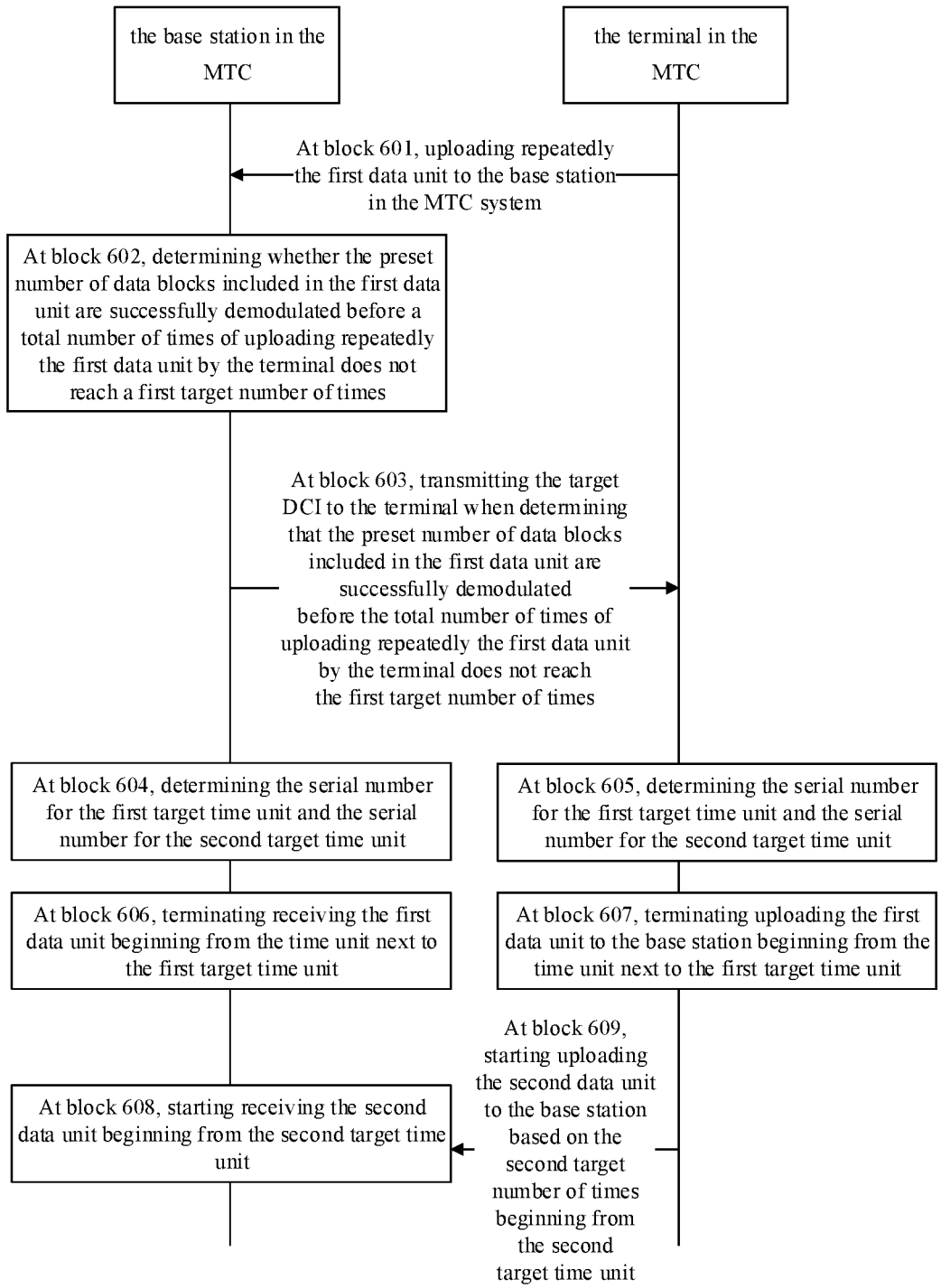
FIG. 14 is a flow chart of another method for prematurely terminating a transmission, according to exemplary embodiments of the disclosure.

The embodiments of the disclosure provide another method for prematurely terminating a transmission. Referring to FIG. 14, FIG. 14 is a flow chart of another method for prematurely terminating a transmission, according to exemplary embodiments of the disclosure. The method may include the following.

At block 601, the terminal in the MTC system may upload repeatedly the first data unit to the base station in the MTC system.

The first data unit may include a plurality of different data blocks that the terminal currently transmits to the base station for demodulation.

At block 602, the base station may determine whether the preset number of data blocks included in the first data unit are successfully demodulated before the total number of times of uploading repeatedly the first data unit by the terminal does not reach the first target number of times.

At block 603, when determining that the preset number of data blocks included in the first data unit are successfully demodulated before the total number of times of uploading repeatedly the first data unit by the terminal does not reach the first target number of times, the base station may transmit the target DCI to the terminal.

The target DCI at least includes the premature terminating indication field, the process number of the Hybrid Automatic Repeat Request (HARQ) corresponding to successfully demodulated data blocks in the first data unit, and the second target number of times.

At block 604, the base station may determine the serial number for the first target time unit and the serial number for the second target time unit.

At block 605, the terminal may determine the serial number for the first target time unit and the serial number for the second target time unit.

The action at block 604 and the action at block 605 may be executed synchronously.

At block 606, the base station may terminate receiving the first data unit beginning from the time unit next to the first target time unit.

At block 607, the terminal may terminate uploading the first data unit to the base station beginning from the time unit next to the first target time unit.

At block 608, the base station may start receiving the second data unit beginning from the second target time unit.

The second data unit may include all data blocks included in the first data unit except for data blocks that the base station has successfully demodulated.

At block 609, the terminal may start uploading the second data unit to the base station based on the second target number of times beginning from the second target time unit.

The action at block 608 and the action at block 609 may be executed synchronously.

In the above embodiments, when the terminal repeatedly and alternately uploads different multiple data blocks to the base station, that is, repeatedly uploads the first data unit to the base station, the base station may transmit the target DCI to the terminal when the preset number of data blocks in the first data unit are demodulated successfully before the total number of times of uploading repeatedly the first data unit by the terminal does not reach the first target number of times, so as to instruct the terminal to prematurely terminate uploading the first data unit to the base station. Therefore, the purpose of prematurely terminating the transmission may be realized, which is beneficial to saving resources of the terminal in the MTC system.

The disclosure may also provide an application function implementation device, embodiments of the corresponding base station and terminal, to correspond the application function implementation methods.

Figure 15:
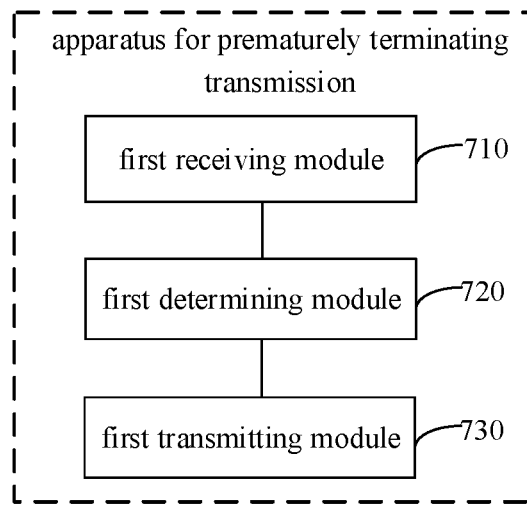
FIG. 15 is a block diagram of an apparatus for prematurely terminating a transmission, according to exemplary embodiments of the disclosure.

Referring to FIG. 15, FIG. 15 is a block diagram of an apparatus for prematurely terminating a transmission, according to exemplary embodiments of the disclosure. The apparatus may be applicable to a base station in a MTC system. The apparatus may include a first receiving module 710, a first determining module 720, and a first transmitting module 730.

The first receiving module 710 is configured to receive a first data unit uploaded repeatedly by a terminal in the MTC system. The first data unit may include a plurality of different data blocks that the terminal currently transmits to the base station for demodulation.

The first determining module 720 is configured to, before a total number of times of uploading repeatedly the first data unit by the terminal does not reach a first target number of times, determine whether all data blocks included in the first data unit are successfully demodulated. The first target number of times is a maximum number of times configured by the base station for the terminal for uploading repeatedly the first data unit.

The first transmitting module 730 is configured to, when determining that all the data blocks included in the first data unit are successfully demodulated before the total number of times of uploading repeatedly the first data unit by the terminal does not reach the first target number of times, transmit target downlink control information (DCI) to the terminal. The target DCI is configured to instruct the terminal to prematurely terminate uploading the first data unit to the base station.

Optionally, the target DCI at least may include a premature terminating indication field.

Figure 16:
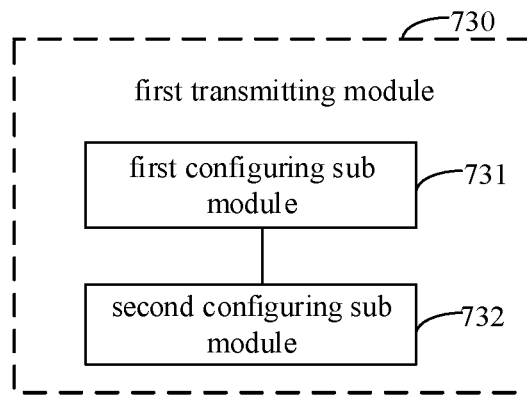
FIG. 16 is a block diagram of another apparatus for prematurely terminating a transmission, according to exemplary embodiments of the disclosure.

Referring to FIG. 16, FIG. 16 is a block diagram of another apparatus for prematurely terminating a transmission, according to exemplary embodiments of the disclosure in FIG. 115. The first transmitting module 730 may include a first configuring sub module 731 and a second configuring sub module 732.

The first configuring sub module 731 is configured to, in a first coverage enhancement mode, employ a resource corresponding to a physical resource block pre-designated in the target DCI as the premature terminating indication field and configure the premature terminating indication field as a first preset value.

The second configuring sub module 732 is configured to, in a second coverage enhancement mode, employ a resource corresponding to a modulation and coding mode field pre-designated in the target DCI as the premature terminating indication field and configure the premature terminating indication field as a second preset value.

A coverage condition of the first coverage enhancement mode is better than a coverage condition of the second coverage enhancement mode.

Figure 17:
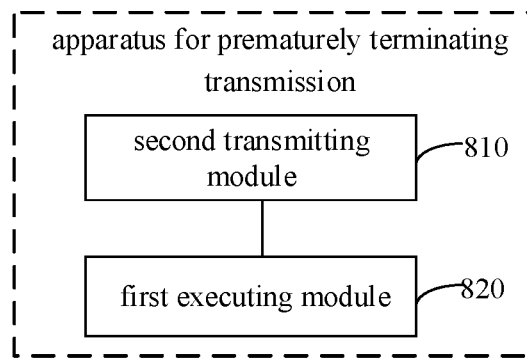
FIG. 17 is a block diagram of another apparatus for prematurely terminating a transmission, according to exemplary embodiments of the disclosure.

Referring to FIG. 17, FIG. 17 is a block diagram of another apparatus for prematurely terminating a transmission, according to exemplary embodiments of the disclosure. The apparatus may be applicable to a terminal in a MTC system. The apparatus may include a second transmitting module 810 and a first executing module 820.

The second transmitting module 810 is configured to upload repeatedly a first data unit to a base station in the MTC system. The first data unit may include a plurality of different data blocks that the terminal currently transmits to the base station for demodulation.

The first executing module 820 is configured to, when receiving target downlink control information (DCI) from the base station before a total number of times of uploading repeatedly the first data unit does not reach a first target number of times, prematurely terminate uploading the first data unit to the base station. The first target number of times is a maximum number of times configured by the base station for the terminal for uploading repeatedly the first data unit.

Figure 18:
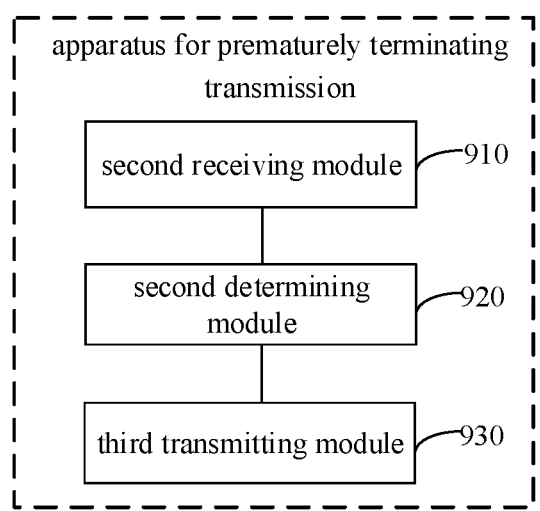
FIG. 18 is a block diagram of another apparatus for prematurely terminating a transmission, according to exemplary embodiments of the disclosure.

Referring to FIG. 18, FIG. 18 is a block diagram of another apparatus for prematurely terminating a transmission, according to exemplary embodiments of the disclosure. The apparatus may be applicable to a base station in a MTC system. The apparatus may include a second receiving module 910, a second determining module 920, and a third transmitting module 930.

The second receiving module 910 is configured to receive a first data unit uploaded repeatedly by a terminal in the MTC system. The first data unit may include a plurality of different data blocks that the terminal currently transmits to the base station for demodulation.

The second determining module 920 is configured to, before a total number of times of uploading repeatedly the first data unit by the terminal does not reach a first target number of times, determine whether a preset number of data blocks included in the first data unit are successfully demodulated. The first target number of times is a maximum number of times configured by the base station for the terminal for uploading repeatedly the first data unit.

The third transmitting module 930 is configured to, when determining that the preset number of data blocks included in the first data unit are successfully demodulated before the total number of times of uploading repeatedly the first data unit by the terminal does not reach the first target number of times, transmit target downlink control information (DCI) to the terminal.

The target DCI is configured to instruct the terminal to repeatedly upload a second data unit to the base station after prematurely terminating uploading the first data unit to the base station, and the second data unit may include all data blocks included in the first data unit except for data blocks that the base station has successfully demodulated.

Figure 19:
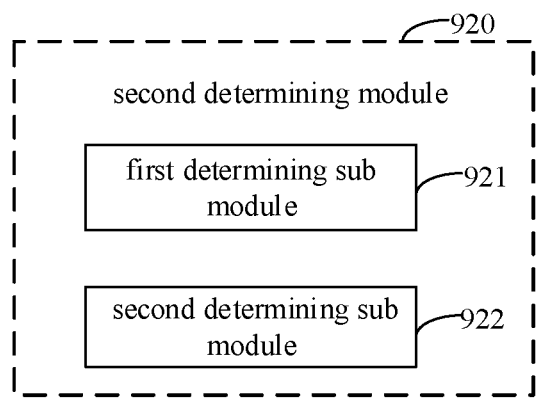
FIG. 19 is a block diagram of another apparatus for prematurely terminating a transmission, according to exemplary embodiments of the disclosure.

Referring to FIG. 19, FIG. 19 is a block diagram of another apparatus for prematurely terminating a transmission, according to exemplary embodiments of the disclosure in FIG. 18. The second determining module 920 may include a first determining sub module 921 or a second determining sub module 922.

The first determining sub module 921 is configured to use a number of data blocks, predefined in a communication protocol, that the base station needs to successfully demodulate in the first data unit, as the preset number.

Or, the second determining sub module 922 is configured to configure the preset number for the terminal through a first preset signaling.

Figure 20:
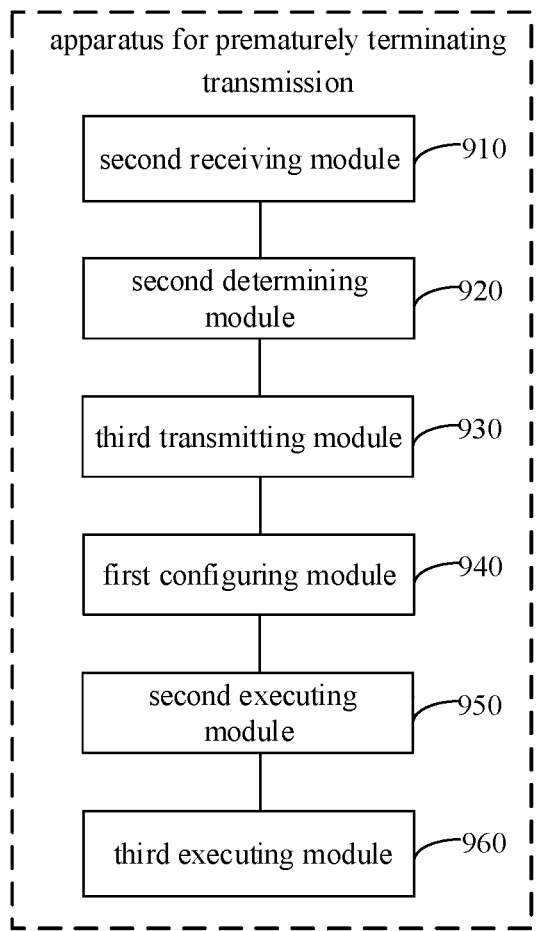
FIG. 20 is a block diagram of another apparatus for prematurely terminating a transmission, according to exemplary embodiments of the disclosure.

Referring to FIG. 20, FIG. 20 is a block diagram of another apparatus for prematurely terminating a transmission, according to exemplary embodiments of the disclosure in FIG. 18. The apparatus may include a first configuring module 940, a second executing module 950, and a third executing module 960.

The first configuring module 940 is configured to respectively configure a serial number for a first target time unit and a serial number for a second target time unit, for the terminal.

The second executing module 950 is configured to terminate receiving the first data unit beginning from a time unit next to the first target time unit.

The third executing module 960 is configured to start receiving the second data unit beginning from the second target time unit.

The serial number for the first target time unit is a serial number corresponding to the first target time unit that satisfies a first target condition, and the serial number for the second target time unit is a serial number corresponding to the second target time unit that satisfies a second target condition.

Optionally, the first target condition may include the following.

The terminal has a smallest number of times of uploading repeatedly the first data unit after receiving the target DCI, and a total number of times of uploading repeatedly, corresponding to each data block included in the first data unit, is the same.

The serial number corresponding to the time unit is greater than or equal to a first sum value, and the first sum value is a sum value of a serial number corresponding to a last time unit for which the terminal receives the target DCI and a first time offset value.

The second target condition may include the following.

A first time unit that the terminal repeatedly uploads the second data unit after the first target time unit.

The serial number corresponding to the time unit is greater than or equal to a second sum value.

The second sum value is a sum value of a serial number corresponding to a last time unit for which the terminal receives the target DCI and a second time offset value, and the second time offset value is greater than the first time offset value.

Or, the second sum value is a sum value of the serial number for the first target time unit and a third time offset value, and the third time offset value is greater than the first time offset value.

Figure 21:
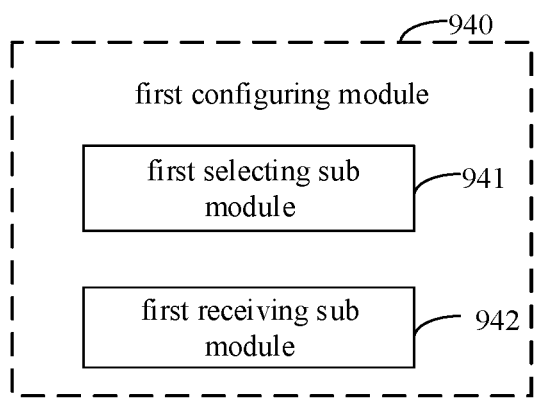
FIG. 21 is a block diagram of another apparatus for prematurely terminating a transmission, according to exemplary embodiments of the disclosure.

Referring to FIG. 21, FIG. 21 is a block diagram of another apparatus for prematurely terminating a transmission, according to exemplary embodiments of the disclosure in FIG. 20. The first configuring module 940 may include a first selecting sub module 941 or a first receiving sub module 942.

The first selecting sub module 941 is configured to use a time offset value, predefined in a communication protocol, corresponding to when the terminal prematurely terminates uploading repeatedly the first data unit, as the first time offset value.

The first receiving sub module 942 is configured to configure the first time offset value for the terminal through a first preset signaling or a second preset signaling.

Figure 22A:
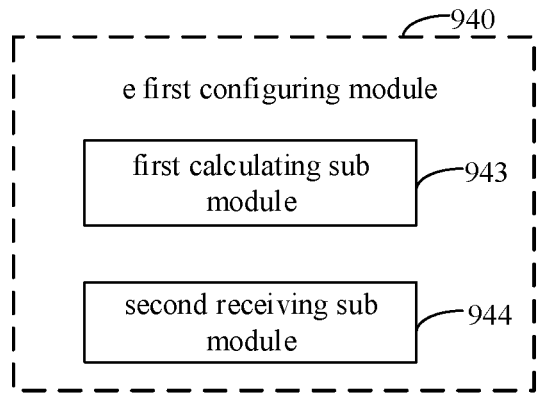
FIG. 22A to FIG. 22B are block diagrams of another apparatus for prematurely terminating a transmission, according to exemplary embodiments of the disclosure.

Referring to FIG. 22A, FIG. 22A is a block diagram of another apparatus for prematurely terminating a transmission, according to exemplary embodiments of the disclosure in FIG. 20. The first configuring module 940 may include a first calculating sub module 943 or a second receiving sub module 944.

The first calculating sub module 943 is configured to calculate the second time offset value based on a correspondence between first time offset values and second time offset values predefined in a communication protocol and the first time offset value.

The second receiving sub module 944 is configured to configure the second time offset value for the terminal through a first preset signaling or a second preset signaling.

Figure 22B:
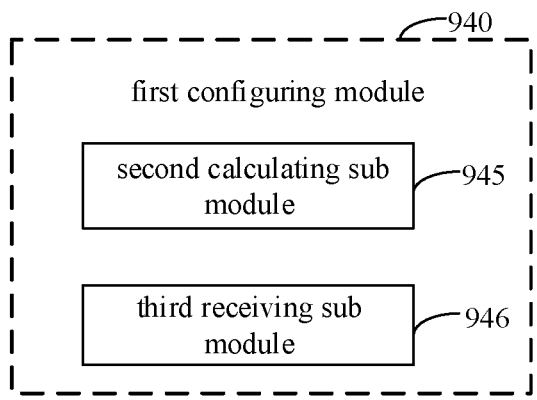

Or, referring to FIG. 22B, FIG. 22B is a block diagram of another apparatus for prematurely terminating a transmission, according to exemplary embodiments of the disclosure in FIG. 20. The first configuring module 940 may include a second calculating sub module 945 or a third receiving sub module 946.

The second calculating sub module 945 is configured to calculate the third time offset value based on a correspondence between first time offset values and third time offset values predefined in a communication protocol and the first time offset value.

The third receiving sub module 946 is configured to configure the third time offset value for the terminal through a first preset signaling or a second preset signaling.

Optionally, the target DCI at least may include a premature terminating indication field, and a process number of a Hybrid Automatic Repeat Request (HARQ) corresponding to successfully demodulated data blocks in the first data unit.

Figure 23:
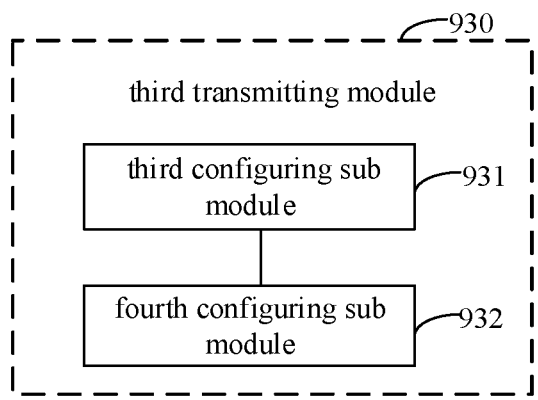
FIG. 23 is a block diagram of another apparatus for prematurely terminating a transmission, according to exemplary embodiments of the disclosure.

Referring to FIG. 23, FIG. 23 is a block diagram of another apparatus for prematurely terminating a transmission, according to exemplary embodiments of the disclosure in FIG. 18. The third transmitting module 930 may include a third configuring sub module 931 and a fourth configuring sub module 932.

The third configuring sub module 931 is configured to, in a first coverage enhancement mode, employ a resource corresponding to a physical resource block pre-designated in the target DCI as the premature terminating indication field and configure the premature terminating indication field as a first preset value.

The fourth configuring sub module 932 is configured to, in a second coverage enhancement mode, employ a resource corresponding to a modulation and coding mode field pre-designated in the target DCI as the premature terminating indication field and configure the premature terminating indication field as a second preset value.

A coverage condition of the first coverage enhancement mode is better than a coverage condition of the second coverage enhancement mode.

Optionally, the target DCI may further include a second target number of times, the second target number of times is a maximum number of times for uploading repeatedly the second data unit by the terminal, and the second target number of times is less than the first target number of times.

Figure 24:
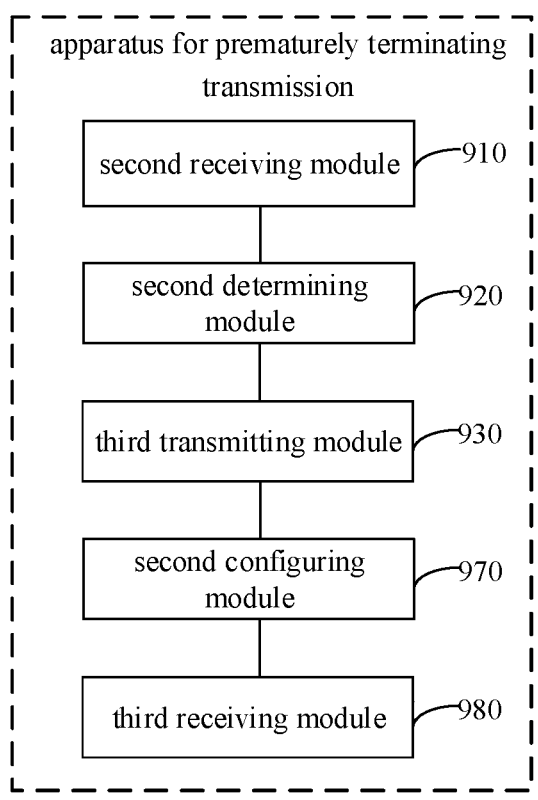
FIG. 24 is a block diagram of another apparatus for prematurely terminating a transmission, according to exemplary embodiments of the disclosure.

Referring to FIG. 24, FIG. 24 is a block diagram of another apparatus for prematurely terminating a transmission, according to exemplary embodiments of the disclosure in FIG. 18. The apparatus may further include a second configuring module 970 and a third receiving module 980.

The second configuring module 970 is configured to configure the second target number of times for the terminal.

The third receiving module 980 is configured to receive the second data unit that the terminal starts to upload repeatedly based on the second target number of times.

Figure 25:
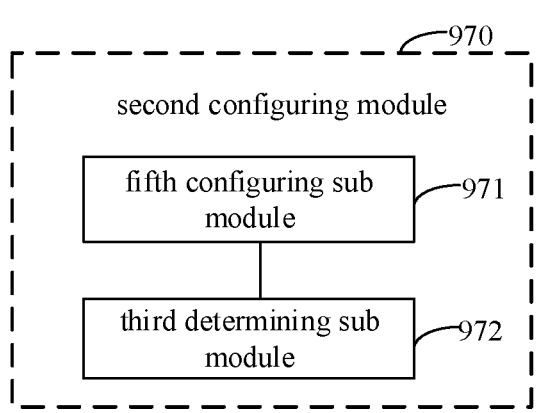
FIG. 25 is a block diagram of another apparatus for prematurely terminating a transmission, according to exemplary embodiments of the disclosure.

Referring to FIG. 25, FIG. 25 is a block diagram of another apparatus for prematurely terminating a transmission, according to exemplary embodiments of the disclosure in FIG. 24. The second configuring module 970 may include a fifth configuring sub module 971 and a third determining sub module 972.

The fifth configuring sub module 971 is configured to configure a set of candidate numbers of times for the terminal through a first preset signaling. The set of candidate numbers of times may include values corresponding to a plurality of candidate numbers of times of repeatedly uploading.

The third determining sub module 972 is configured to specify a value in the set of candidate numbers of times through the target DCI as a value corresponding to the second target number of times.

Figure 26:
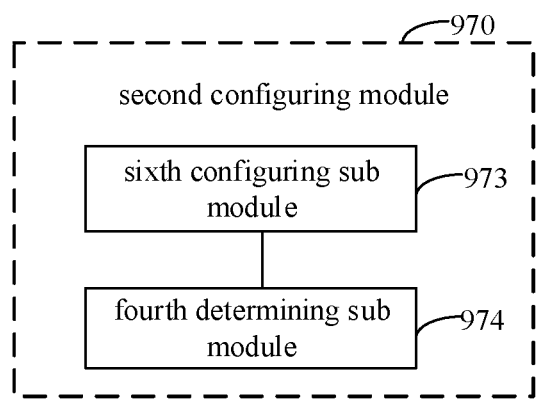
FIG. 26 is a block diagram of another apparatus for prematurely terminating a transmission, according to exemplary embodiments of the disclosure.

Referring to FIG. 26, FIG. 26 is a block diagram of another apparatus for prematurely terminating a transmission, according to exemplary embodiments of the disclosure in FIG. 24. The second configuring module 970 may include a sixth configuring sub module 973 and a fourth determining sub module 974.

The sixth configuring sub module 973 is configured to configure a set of candidate offsets for the terminal through a first preset signaling. The set of candidate offsets may include values corresponding to a plurality of candidate offsets.

The fourth determining sub module 974 is configured to select a value from the set of candidate offsets through the target DCI as a value corresponding to a target offset. The second target number of times is calculated by the terminal based on the first target number of times and the target offset.

Figure 27:
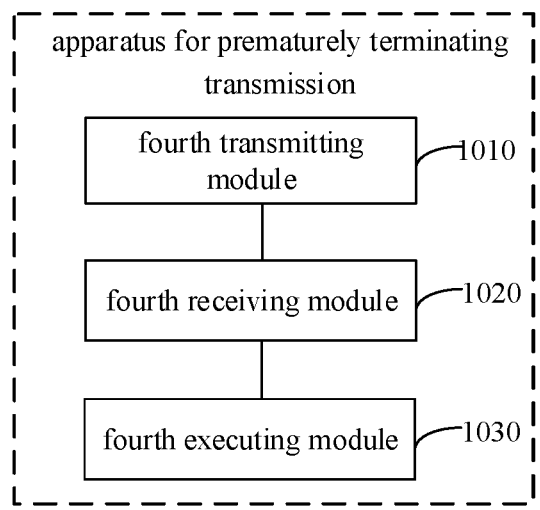
FIG. 27 is a block diagram of another apparatus for prematurely terminating a transmission, according to exemplary embodiments of the disclosure.

Referring to FIG. 27, FIG. 27 is a block diagram of another apparatus for prematurely terminating a transmission, according to exemplary embodiments of the disclosure. The apparatus may be applicable to a terminal in a MTC system. The apparatus may further include a fourth transmitting module 1010, a fourth receiving module 1020, and a fourth executing module 1030.

The fourth transmitting module 1010 is configured to upload repeatedly a first data unit to a base station in the MTC system. The first data unit may include a plurality of different data blocks that the terminal currently transmits to the base station for demodulation.

The fourth receiving module 1020 is configured to, when receiving target downlink control information (DCI) from the base station before a total number of times of uploading repeatedly the first data unit does not reach a first target number of times, prematurely terminate uploading the first data unit to the base station. The first target number of times is a maximum number of times configured by the base station for the terminal for uploading repeatedly the first data unit.

The fourth executing module 1030 is configured to, after prematurely terminating uploading the first data unit, upload repeatedly a second data unit to the base station. The second data unit may include all data blocks included in the first data unit except for data blocks that the base station has successfully demodulated.

Figure 28:
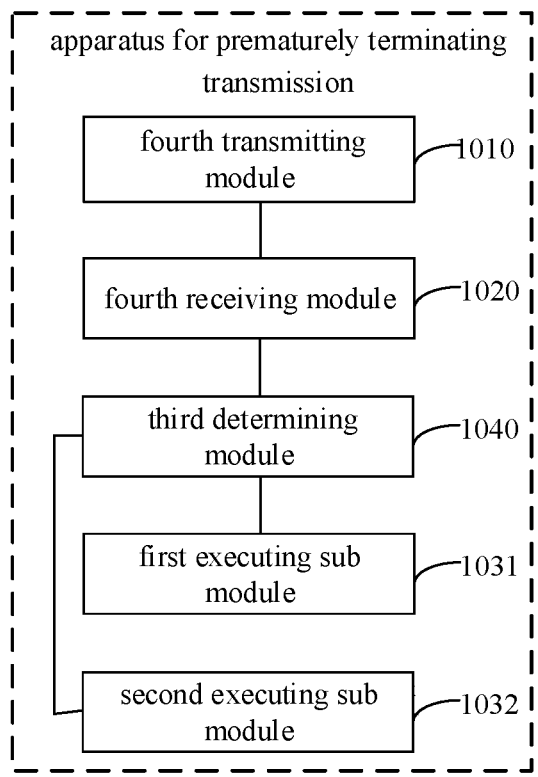
FIG. 28 is a block diagram of another apparatus for prematurely terminating a transmission, according to exemplary embodiments of the disclosure.

Referring to FIG. 28, FIG. 28 is a block diagram of another apparatus for prematurely terminating a transmission, according to exemplary embodiments of the disclosure in FIG. 27. The apparatus may further include a third determining module 1040.

The third determining module 1040 is configured to determine a serial number of a first target time unit and a serial number of a second target time unit, configured by the base station for the terminal.

The first target time unit satisfies a first target condition; and the second target time unit satisfies a second target condition.

The fourth executing module 1030 may include a first executing sub module 1031.

The first executing sub module 1031 is configured to terminate transmitting the first data unit to the base station beginning from a time unit next to the first target time unit.

The fourth executing module 1030 may include a second executing sub module 1032.

The second executing sub module 1032 is configured to upload repeatedly the second data unit to the base station beginning from the second target time unit.

Optionally, the first target condition may include the following.

The terminal has a smallest number of times of uploading repeatedly the first data unit after receiving the target DCI, and a total number of times of uploading repeatedly, corresponding to each data block included in the first data unit, is the same.

The serial number corresponding to the time unit is greater than or equal to a first sum value, and the first sum value is a sum value of a serial number corresponding to a last time unit for which the terminal receives the target DCI and a first time offset value.

The second target condition may include the following.

A first time unit that the terminal repeatedly uploads the second data unit after the first target time unit.

The serial number corresponding to the time unit is greater than or equal to a second sum value.

The second sum value is a sum value of a serial number corresponding to a last time unit for which the terminal receives the target DCI and a second time offset value, and the second time offset value is greater than the first time offset value.

Or, the second sum value is a sum value of the serial number for the first target time unit and a third time offset value, and the third time offset value is greater than the first time offset value.

Figure 29:
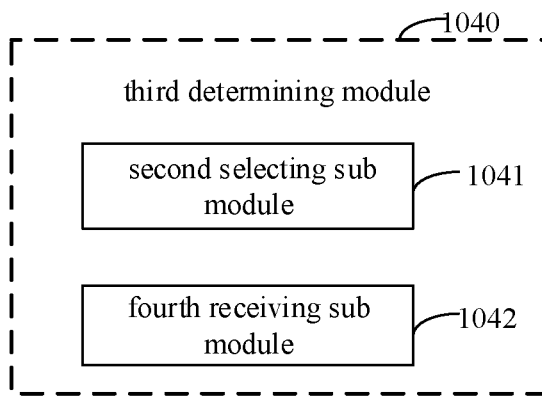
FIG. 29 is a block diagram of another apparatus for prematurely terminating a transmission, according to exemplary embodiments of the disclosure.

Referring to FIG. 29, FIG. 29 is a block diagram of another apparatus for prematurely terminating a transmission, according to exemplary embodiments of the disclosure in FIG. 28. The third determining module 1040 may include a second selecting sub module 1041 or a fourth receiving sub module 1042.

The second selecting sub module 1041 is configured to use a time offset value, predefined in a communication protocol, corresponding to when the terminal prematurely terminates uploading repeatedly the first data unit, as the first time offset value.

The fourth receiving sub module 1042 is configured to receive the first time offset value configured by the base station for the terminal through a first preset signaling or a second preset signaling.

Figure 30A:
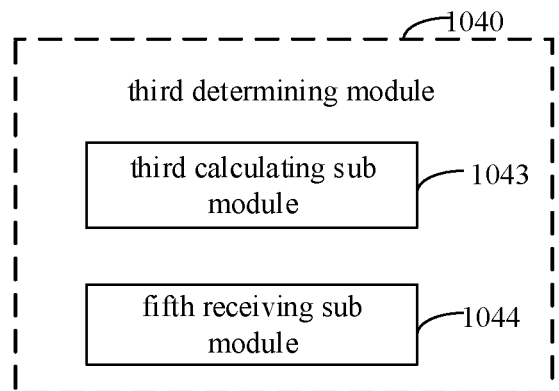
FIG. 30A to FIG. 30B are block diagrams of another apparatus for prematurely terminating a transmission, according to exemplary embodiments of the disclosure.

Referring to FIG. 30A, FIG. 30A is a block diagram of another apparatus for prematurely terminating a transmission, according to exemplary embodiments of the disclosure in FIG. 28. The third determining module 1040 may include a third calculating sub module 1043 or a fifth receiving sub module 1044.

The third calculating sub module 1043 is configured to calculate the second time offset value based on a correspondence between first time offset values and second time offset values predefined in a communication protocol and the first time offset value.

The fifth receiving sub module 1044 is configured to receive the second time offset value configured by the base station for the terminal through a first preset signaling or a second preset signaling.

Figure 30B:
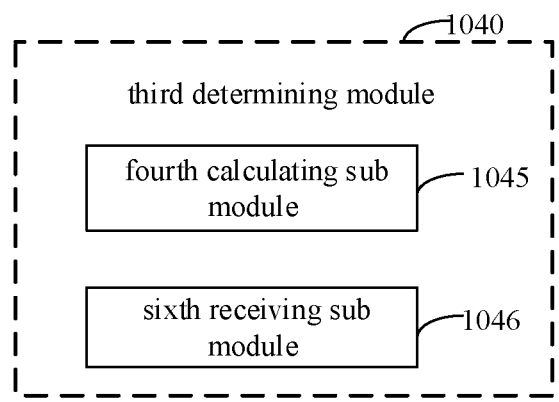

Or, referring to FIG. 30B, FIG. 30B is a block diagram of another apparatus for prematurely terminating a transmission, according to exemplary embodiments of the disclosure in FIG. 28. The third determining module 1040 may include a fourth calculating sub module 1045 or a sixth receiving sub module 1046.

The fourth calculating sub module 1045 is configured to calculate the third time offset value based on a correspondence between first time offset values and third time offset values predefined in a communication protocol and the first time offset value.

The sixth receiving sub module 1046 is configured to receive the third time offset value configured by the base station for the terminal through a first preset signaling or a second preset signaling.

Figure 31:
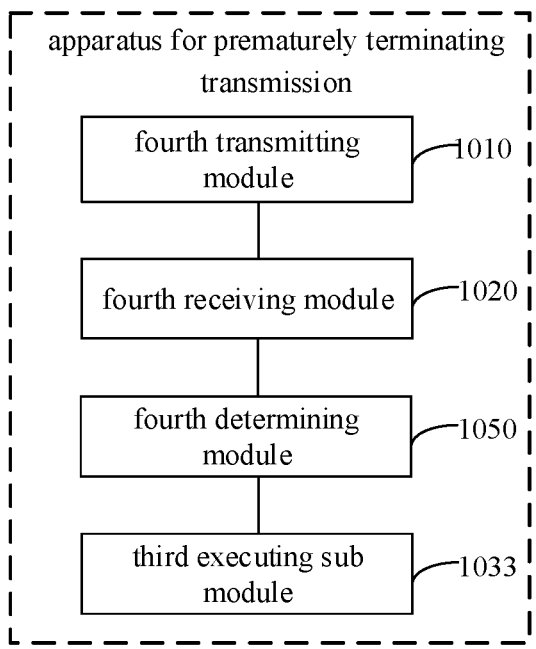
FIG. 31 is a block diagram of another apparatus for prematurely terminating a transmission, according to exemplary embodiments of the disclosure.

Referring to FIG. 31, FIG. 31 is a block diagram of another apparatus for prematurely terminating a transmission, according to exemplary embodiments of the disclosure in FIG. 27. The apparatus may further include a fourth determining module 1050.

The fourth determining module 1050 is configured to determine a second target number of times configured by the base station for the terminal; the second target number of times is a maximum number of times for uploading repeatedly the second data unit by the terminal, and the second target number of times is less than the first target number of times.

The fourth executing module 1040 may include a third executing sub module 1033.

The third executing sub module 1033 is configured to start to upload repeatedly the second data unit to the base station based on the second target number of times.

Figure 32:
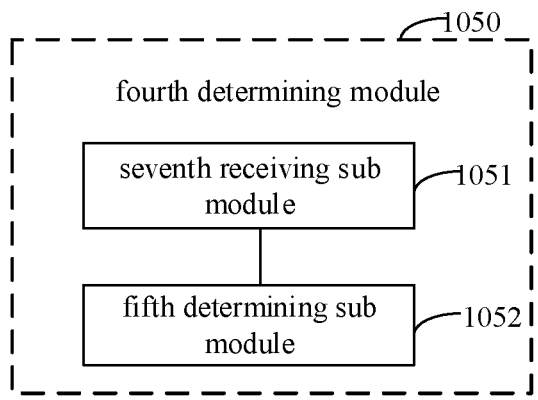
FIG. 32 is a block diagram of another apparatus for prematurely terminating a transmission, according to exemplary embodiments of the disclosure.

Referring to FIG. 32, FIG. 32 is a block diagram of another apparatus for prematurely terminating a transmission, according to exemplary embodiments of the disclosure in FIG. 31. The fourth determining module 1050 may include a seventh receiving sub module 1051 and a fifth determining sub module 1052.

The seventh receiving sub module 1051 is configured to receive a set of candidate numbers of times configured by the base station for the terminal through a first preset signaling. The set of candidate numbers of times may include values corresponding to a plurality of candidate numbers of times of repeatedly uploading.

The fifth determining sub module 1052 is configured to use a value specified through the target DCI in the set of candidate numbers of times as a value corresponding to the second target number of times.

Figure 33:
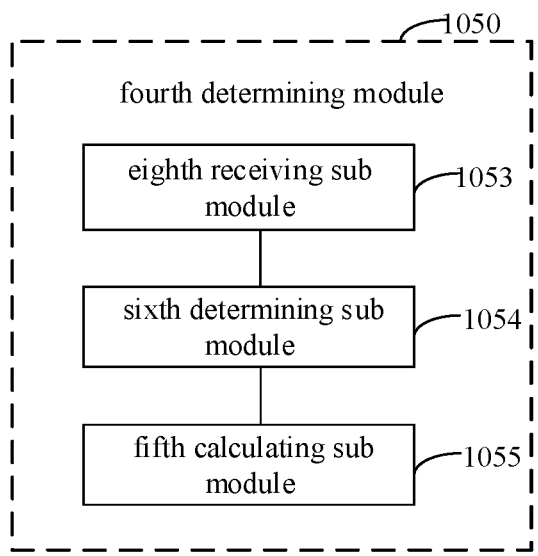
FIG. 33 is a block diagram of another apparatus for prematurely terminating a transmission, according to exemplary embodiments of the disclosure.

Referring to FIG. 33, FIG. 33 is a block diagram of another apparatus for prematurely terminating a transmission, according to exemplary embodiments of the disclosure in FIG. 31. The fourth determining module 1050 may include an eighth receiving sub module 1053, a sixth determining sub module 1054, and a fifth calculating sub module 1055.

The eighth receiving sub module 1053 is configured to receive a set of candidate offsets configured by the base station for the terminal through a first preset signaling. The set of candidate offsets may include values corresponding to a plurality of candidate offsets.

The sixth determining sub module 1054 is configured to use a value selected through the target DCI from the set of candidate offsets as a value corresponding to a target offset.

The fifth calculating sub module 1055 is configured to obtain the second target number of times by calculating based on the first target number of times and the target offset.

For apparatus embodiments, since they substantially correspond to method embodiments, reference of the related parts may be made to the parts of the description of the method embodiments. The apparatus embodiments described above are merely illustrative. The units described above as separate components may or may not be physically separated. The components displayed as units may or may not be physical units. That is, they may be located in one place, or distributed to multiple network units. Some or all of the modules may be selected according to actual needs to achieve the objectives of the solutions of the disclosure. Those of ordinary skill in the art may understand and implement without creative work.

Accordingly, the disclosure may also provide a computer-readable storage medium. The computer-readable storage medium may have stored therein instructions for performing the method for prematurely terminating a transmission in the base station side in the first solution.

Accordingly, the disclosure may also provide a computer-readable storage medium. The computer-readable storage medium may have stored therein instructions for performing the method for prematurely terminating a transmission in the terminal side in the first solution.

Accordingly, the disclosure may also provide a computer-readable storage medium. The computer-readable storage medium may have stored therein instructions for performing the method for prematurely terminating a transmission in the base station side in the second solution.

Accordingly, the disclosure may also provide a computer-readable storage medium. The computer-readable storage medium may have stored therein instructions for performing the method for prematurely terminating a transmission in the terminal side in the second solution.

Accordingly, the disclosure may also provide a device for prematurely terminating a transmission, for a base station in a MTC system.

The device may include a processor.

The device may include a memory for storing instructions executable by the processor.

The processor is configured to perform the following.

A first data unit uploaded repeatedly by a terminal in the MTC system may be received. The first data unit may include a plurality of different data blocks that the terminal currently transmits to the base station for demodulation.

Before a total number of times of uploading repeatedly the first data unit by the terminal does not reach a first target number of times, it is determined whether all data blocks included in the first data unit are successfully demodulated. The first target number of times is a maximum number of times configured by the base station for the terminal for uploading repeatedly the first data unit.

When determining that all the data blocks included in the first data unit are successfully demodulated before the total number of times of uploading repeatedly the first data unit by the terminal does not reach the first target number of times, target downlink control information (DCI) may be transmitted to the terminal. The target DCI is configured to instruct the terminal to prematurely terminate uploading the first data unit to the base station.

Accordingly, the disclosure may also provide a device for prematurely terminating a transmission, for a base station in a MTC system.

The device may include a processor.

The device may include a memory for storing instructions executable by the processor.

The processor is configured to perform the following.

A first data unit may be uploaded repeatedly to a base station in the MTC system. The first data unit may include a plurality of different data blocks that the terminal currently transmits to the base station for demodulation.

When receiving target downlink control information (DCI) from the base station before a total number of times of uploading repeatedly the first data unit does not reach a first target number of times, uploading the first data unit to the base station may be prematurely terminated. The first target number of times is a maximum number of times configured by the base station for the terminal for uploading repeatedly the first data unit.

Accordingly, the disclosure may also provide a device for prematurely terminating a transmission, for a base station in a MTC system.

The device may include a processor.

The device may include a memory for storing instructions executable by the processor.

The processor is configured to perform the following.

A first data unit uploaded repeatedly by a terminal in the MTC system may be received. The first data unit may include a plurality of different data blocks that the terminal currently transmits to the base station for demodulation.

Before a total number of times of uploading repeatedly the first data unit by the terminal does not reach a first target number of times, it is determined whether a preset number of data blocks included in the first data unit are successfully demodulated. The first target number of times is a maximum number of times configured by the base station for the terminal for uploading repeatedly the first data unit.

When determining that the preset number of data blocks included in the first data unit are successfully demodulated before the total number of times of uploading repeatedly the first data unit by the terminal does not reach the first target number of times, target downlink control information (DCI) may be transmitted to the terminal.

The target DCI is configured to instruct the terminal to repeatedly upload a second data unit to the base station after prematurely terminating uploading the first data unit to the base station. The second data unit may include all data blocks included in the first data unit except for data blocks that the base station has successfully demodulated.

Accordingly, the disclosure may also provide a device for prematurely terminating a transmission, for a base station in a MTC system.

The device may include a processor.

The device may include a memory for storing instructions executable by the processor.

The processor is configured to perform the following.

A first data unit may be uploaded repeatedly to a base station in the MTC system. The first data unit may include a plurality of different data blocks that the terminal currently transmits to the base station for demodulation.

When receiving target downlink control information (DCI) from the base station before a total number of times of uploading repeatedly the first data unit does not reach a first target number of times, uploading the first data unit to the base station may be prematurely terminated. The first target number of times is a maximum number of times configured by the base station for the terminal for uploading repeatedly the first data unit.

After prematurely terminating uploading the first data unit, a second data unit may be uploaded repeatedly to the base station. The second data unit may include all data blocks included in the first data unit except for data blocks that the base station has successfully demodulated.

Figure 34:
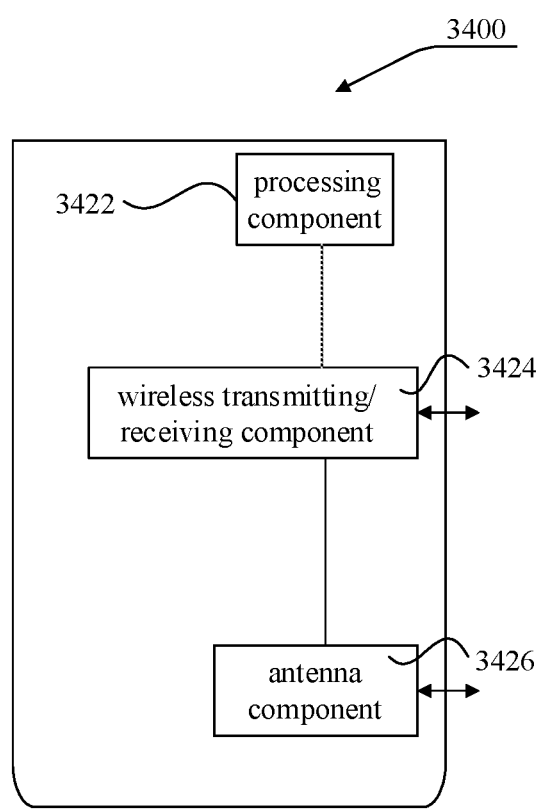
FIG. 34 is a block diagram of a device for prematurely terminating a transmission, according to exemplary embodiments of the disclosure.

As illustrated in FIG. 34, FIG. 34 is a block diagram of a device 3400 for prematurely terminating a transmission, according to exemplary embodiments of the disclosure. The device 3400 may be provided as the base station in the MTC system. Referring to FIG. 34, the device 3400 may include a processing component 3422, a wireless transmitting/receiving component 3424, an antenna component 3426, and a signal processing part specific to a wireless interface. The processing component 3422 may further include one or more processors.

One of the processors in the processing component 3422 may be configured to execute the method for prematurely terminating a transmission on the base station side in any of the above solutions.

Figure 35:
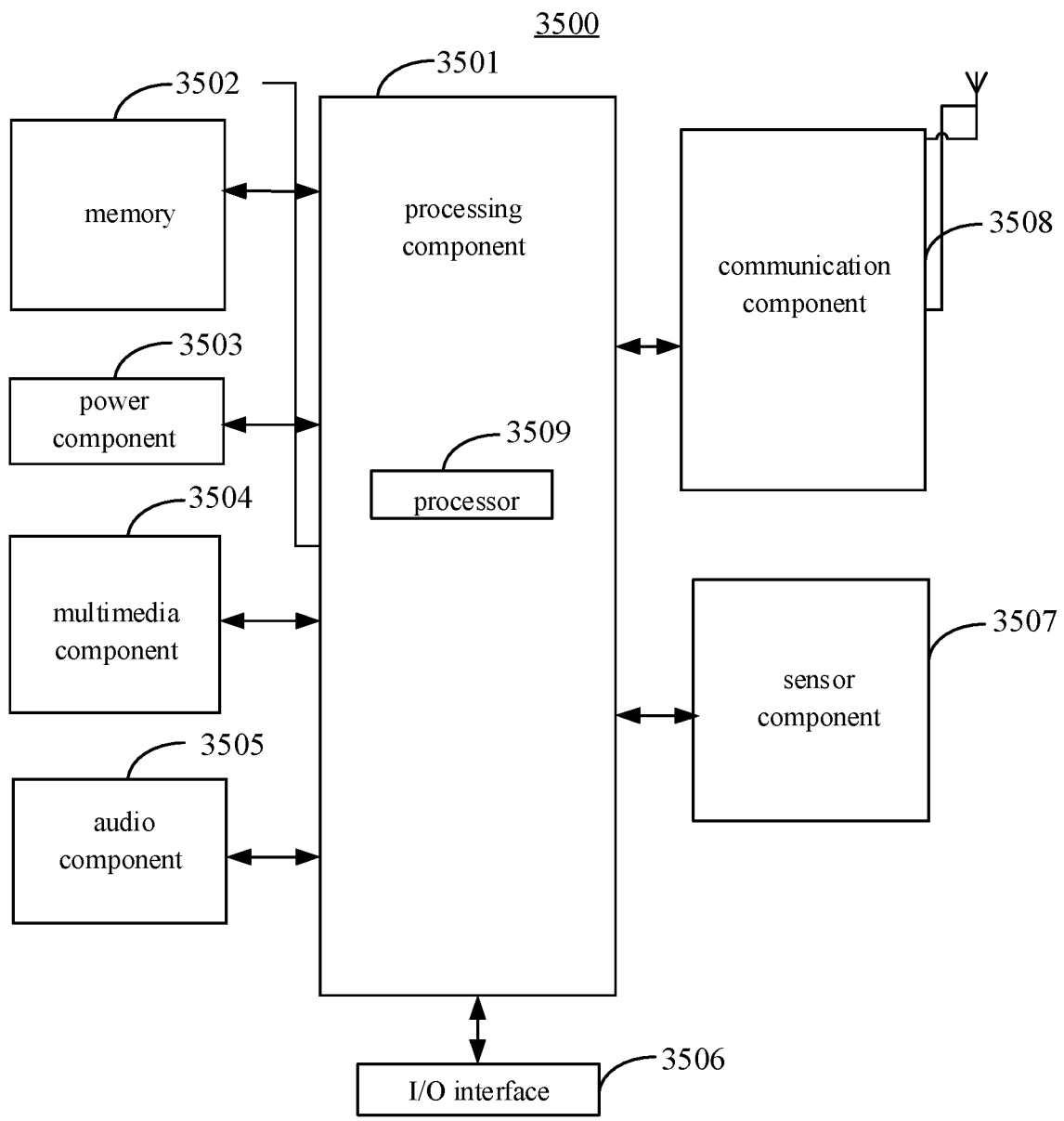
FIG. 35 is a block diagram of another device for prematurely terminating a transmission, according to exemplary embodiments of the disclosure.

FIG. 35 is a block diagram of another device for prematurely terminating a transmission, according to exemplary embodiments of the disclosure. As illustrated in FIG. 35, another device 3500 for prematurely terminating a transmission, according to exemplary embodiments of the disclosure may be illustrated. The device 3500 may be a terminal, such as a computer, a mobile phone, a digital broadcast terminal, a messaging device, a gaming console, a tablet, a medical device, exercise equipment, a personal digital assistant, and the like.

Referring to FIG. 3500, the device 3500 may include one or more of the following components: a processing component 3501, a memory 3502, a power component 3503, a multimedia component 3504, an audio component 3505, an input/output (I/O) interface 3506, a sensor component 3507, and a communication component 3508.

The processing component 3501 typically controls overall operations of the device 3500, such as the operations associated with display, telephone calls, data communications, camera operations, and recording operations. The processing component 3501 may include one or more processors 3509 to execute instructions to perform all or part of the steps in the above described methods. Moreover, the processing component 3501 may include one or more modules which facilitate the interaction between the processing component 3501 and other components. For instance, the processing component 3501 may include a multimedia module to facilitate the interaction between the multimedia component 3504 and the processing component 3501.

The memory 3502 is configured to store various types of data to support the operation of the device 3500. Examples of such data include instructions for any applications or methods operated on the device 3500, contact data, phonebook data, messages, pictures, video, etc. The memory 3502 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3503 provides power to various components of the device 3500. The power component 3503 may include a power management system, one or more power sources, and any other components associated with the generation, management, and distribution of power in the device 3500.

The multimedia component 3504 includes a screen providing an output interface between the device 3500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3504 includes a front camera and/or a rear camera. The front camera and the rear camera may receive an external multimedia datum while the device 3500 is in an operation mode, such as a photographing mode or a video mode. Each of the front camera and the rear camera may be a fixed optical lens system or have focus and optical zoom capability.

The audio component 3505 is configured to output and/or input audio signals. For example, the audio component 3505 includes a microphone ("MIC") configured to receive an external audio signal when the device 3500 is in an operation mode, such as a call mode, a recording mode, and a voice recognition mode. The received audio signal may be further stored in the memory 3502 or transmitted via the communication component 3508. In some embodiments, the audio component 810 further includes a speaker to output audio signals.

The I/O interface 3506 provides an interface between the processing component 3501 and peripheral interface modules, such as a keyboard, a click wheel, buttons, and the like. The buttons may include, but are not limited to, a home button, a volume button, a starting button, and a locking button.

The sensor component 3507 includes one or more sensors to provide status assessments of various aspects of the device 3500. For instance, the sensor component 3507 may detect an open/closed status of the device 3500, relative positioning of components, e.g., the display and the keypad, of the device 3500, a change in position of the device 3500 or a component of the device 3500, a presence or absence of user contact with the device 3500, an orientation or an acceleration/deceleration of the device 3500, and a change in temperature of the device 3500. The sensor component 3507 may include a proximity sensor configured to detect the presence of nearby objects without any physical contact. The sensor component 3507 may also include a light sensor, such as a CMOS or CCD image sensor, for use in imaging applications. In some embodiments, the sensor component 3507 may also include an accelerometer sensor, a gyroscope sensor, a magnetic sensor, a pressure sensor, or a temperature sensor.

The communication component 3508 is configured to facilitate communication, wired or wirelessly, between the device 3500 and other devices. The device 3500 can access a wireless network based on a communication standard, such as WiFi, 2G, or 3G, or a combination thereof. In one exemplary embodiment, the communication component 3508 receives a broadcast signal or broadcast associated information from an external broadcast management system via a broadcast channel. In one exemplary embodiment, the communication component 3508 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 3502, executable by the processor 3509 in the device 3500, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the apparatus 3500 may execute the method for prematurely terminating the transmission on the terminal side in any of the above solutions.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for prematurely terminating a transmission, comprising:
   receiving, by a base station in a machine type communication (MTC) system, a first data repeatedly uploaded by a terminal in the MTC system, the first data comprising a plurality of different data blocks currently transmitted from the terminal to the base station for demodulation;
   before a total number of times of repeatedly uploading the first data by the terminal reaches a first target number of times, determining, by the base station, whether a preset number of data blocks included in the first data are successfully demodulated, the first target number of times being a maximum number of times configured by the base station for the terminal for repeatedly uploading the first data; and
   in response to determining that the preset number of data blocks included in the first data are successfully demodulated before the total number of times of repeatedly uploading the first data by the terminal reaches the first target number of times, transmitting, by the base station, target downlink control information (DCI) to the terminal;
   wherein the target DCI is configured to instruct the terminal to repeatedly upload a second data to the base station after prematurely terminating uploading the first data to the base station, and the second data comprises all data blocks included in the first data except for data blocks that the base station has successfully demodulated.

2. The method of claim 1, wherein the preset number is determined by one of following acts:
   using a number of data blocks as the preset number, wherein the number of the data blocks is predefined in a communication protocol and the base station needs to successfully demodulate the data blocks in the first data; or
   configuring the preset number for the terminal through a first preset signaling.

3. The method of claim 1, further comprising:
   respectively configuring a serial number for a first target time and a serial number for a second target time for the terminal;
   terminating receiving the first data beginning from a time next to the first target time; and
   starting receiving the second data beginning from the second target time;
   wherein the serial number for the first target time is a serial number corresponding to the first target time that satisfies a first target condition, and the serial number for the second target time is a serial number corresponding to the second target time that satisfies a second target condition.

4. The method of claim 3, wherein,
   the first target condition comprises that: the terminal has a smallest number of times of repeatedly uploading the first data after receiving the target DCI, and each data block included in the first data has a same total number of times of repeatedly uploading; and
   the serial number corresponding to the first target time is greater than or equal to a first sum value, and the first sum value is a sum value of a serial number corresponding to a last time and a first time offset value, wherein the terminal receives the target DCI at the last time;
   the second target condition comprises that: the terminal repeatedly uploads a first time in the second data after the first target time; and
   the serial number corresponding to the second target time is greater than or equal to a second sum value;
   wherein the second sum value is one of following values:
   the second sum value is a sum value of a serial number corresponding to the last time and a second time offset value, the terminal receives the target DCI at the last time, and the second time offset value is greater than the first time offset value; or
   the second sum value is a sum value of the serial number for the first target time and a third time offset value, and the third time offset value is greater than the first time offset value.

5. The method of claim 4, wherein the first time offset value is determined by one of following acts:
   using a time offset value as the first time offset value, wherein the time offset value is predefined in a communication protocol and corresponding to a termination time, and the terminal prematurely terminates repeatedly uploading the first data at the termination time; or
   configuring the first time offset value for the terminal through a first preset signaling or a second preset signaling;
   wherein the second time offset value is determined by one of following acts:
   calculating the second time offset value based on a correspondence between first time offset values and second time offset values predefined in a communication protocol and the first time offset value; or
   configuring the second time offset value for the terminal through a first preset signaling or a second preset signaling; and
   wherein the third time offset value is determined by one of following acts:
   calculating the third time offset value based on the correspondence between first time offset values and third time offset values predefined in a communication protocol and the first time offset value; or
   configuring the third time offset value for the terminal through a first preset signaling or a second preset signaling.

6. The method of claim 1, wherein the target DCI at least comprises a premature terminating indication field and a process number of a Hybrid Automatic Repeat Request (HARD) corresponding to successfully demodulated data blocks in the first data,
   the premature terminating indication field in the target DCI is configured by one of following acts:
   in a first coverage enhancement mode, employing a resource corresponding to a physical resource block pre-designated in the target DCI as the premature terminating indication field and configuring the premature terminating indication field as a first preset value; and
   in a second coverage enhancement mode, employing a resource corresponding to a modulation and coding mode field pre-designated in the target DCI as the premature terminating indication field and configuring the premature terminating indication field as a second preset value; wherein a coverage condition of the first coverage enhancement mode is better than a coverage condition of the second coverage enhancement mode.

7. The method of claim 6, wherein the target DCI further comprises a second target number of times, the second target number of times is a maximum number of times for repeatedly uploading the second data by the terminal, and the second target number of times is less than the first target number of times.

8. The method of claim 7, wherein after transmitting the target DCI to the terminal, the method further comprises:
configuring the second target number of times for the terminal; and
receiving the second data that the terminal starts repeatedly uploading based on the second target number of times.

9. The method of claim 8, wherein configuring the second target number of times for the terminal comprises:
configuring a set of candidate numbers of times for the terminal through a first preset signaling, the set of candidate numbers of times comprising values corresponding to a plurality of candidate numbers of times of repeatedly uploading; and
specifying a value in the set of candidate numbers of times through the target DCI as a value corresponding to the second target number of times.

10. The method of claim 8, wherein configuring the second target number of times for the terminal comprises:
configuring a set of candidate offsets for the terminal through a first preset signaling, the set of candidate offsets comprising values corresponding to a plurality of candidate offsets; and
selecting a value from the set of candidate offsets through the target DCI as a value corresponding to a target offset, wherein the second target number of times is calculated by the terminal based on the first target number of times and the target offset.

11. A base station in a machine type communication (MTC) system, comprising:
a processor; and
a memory for storing instructions executable by the processor;
wherein the processor is configured to perform the method of claim 4.

12. A method for prematurely terminating a transmission, comprising:
repeatedly uploading, by a terminal in a machine type communication (MTC) system, a first data to a base station in the MTC system, the first data comprising a plurality of different data blocks currently transmitted from the terminal to the base station for demodulation; and
in response to receiving target downlink control information (DCI) from the base station before a total number of times of repeatedly uploading the first data reaches a first target number of times, prematurely terminating, by the terminal, uploading the first data to the base station, the first target number of times being a maximum number of times configured by the base station for the terminal for repeatedly uploading the first data; and
after prematurely terminating uploading the first data, repeatedly uploading, by the terminal, a second data to the base station, the second data comprising all data blocks included in the first data except for data blocks that the base station has successfully demodulated.

13. The method of claim 12, further comprising:
determining a serial number of a first target time and a serial number of a second target time configured by the base station for the terminal, wherein the first target time satisfies a first target condition and the second target time satisfies a second target condition;
wherein prematurely terminating uploading the first data to the base station comprises:
terminating transmitting the first data to the base station beginning from a time next to the first target time;
wherein repeatedly uploading the second data to the base station comprises:
repeatedly uploading the second data to the base station beginning from the second target time.

14. The method of claim 13, wherein,
the first target condition comprises that: the terminal has a smallest number of times of repeatedly uploading the first data after receiving the target DCI, and each data block included in the first data has a same total number of times of repeatedly uploading;
the serial number corresponding to the first target time is greater than or equal to a first sum value, and the first sum value is a sum value of a serial number corresponding to a last time unit and a first time offset value, wherein the terminal receives the target DCI at the last time;
the second target condition comprises that: the terminal repeatedly uploads a first time in the second data after the first target time; and
the serial number corresponding to the second target time is greater than or equal to a second sum value;
wherein the second sum value is one of following values:
the second sum value is a sum value of a serial number corresponding to the last time and a second time offset value, the terminal receives the target DCI at the last time, and the second time offset value is greater than the first time offset value; or
the second sum value is a sum value of the serial number for the first target time and a third time offset value, and the third time offset value is greater than the first time offset value.

15. The method of claim 14, wherein, the first time offset value is determined by one of following acts:
using a time offset value as the first offset value, wherein the time offset value is predefined in a communication protocol and corresponding to a termination time, and the terminal prematurely terminates repeatedly uploading the first data at the termination time; or
receiving the first time offset value configured by the base station for the terminal through a first preset signaling or a second preset signaling.

16. The method of claim 14,
wherein the second time offset value is determined by one of following acts:
calculating the second time offset value based on a correspondence between first time offset values and second time offset values predefined in a communication protocol and the first time offset value; or
receiving the second time offset value configured by the base station for the terminal through a first preset signaling or a second preset signaling; and
wherein the third time offset value is determined by one of following acts:
calculating the third time offset value based on the correspondence between first time offset values and third time offset values predefined in a communication protocol and the first time offset value; or receiving the third time offset value configured by the base station for the terminal through a first preset signaling or a second preset signaling.

17. The method of claim 12, wherein after prematurely terminating uploading the first data, the method further comprises:
    determining a second target number of times configured by the base station for the terminal, wherein the second target number of times is a maximum number of times for repeatedly uploading the second data by the terminal, and the second target number of times is less than the first target number of times; and
    wherein repeatedly uploading the second data to the base station comprises:
        starting repeatedly uploading the second data to the base station based on the second target number of times.

18. The method of claim 17, wherein determining the second target number of times configured by the base station for the terminal comprises one of following acts:
    receiving a set of candidate numbers of times configured by the base station for the terminal through a first preset signaling, the set of candidate numbers of times comprising values corresponding to a plurality of candidate numbers of times of repeatedly uploading; and using a value specified through the target DCI in the set of candidate numbers of times as a value corresponding to the second target number of times; or
    receiving a set of candidate offsets configured by the base station for the terminal through a first preset signaling, the set of candidate offsets comprising values corresponding to a plurality of candidate offsets; using a value selected through the target DCI from the set of candidate offsets as a value corresponding to a target offset; and obtaining the second target number of times by calculating based on the first target number of times and the target offset.

19. A terminal in a machine type communication (MTC) system, comprising:
    a processor; and
    a memory for storing instructions executable by the processor;
    wherein the processor is configured to perform the method of claim 15.

* * * * *